United States Patent
Uemura et al.

(10) Patent No.: US 11,148,518 B2
(45) Date of Patent: Oct. 19, 2021

(54) ELECTRIC WORK VEHICLE ARRANGEMENT

(71) Applicant: Kubota Corporation, Osaka (JP)

(72) Inventors: Katsuhiko Uemura, Sakai (JP); Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 69 days.

(21) Appl. No.: 16/677,137

(22) Filed: Nov. 7, 2019

(65) Prior Publication Data

US 2020/0207199 A1 Jul. 2, 2020

(30) Foreign Application Priority Data

| Dec. 26, 2018 | (JP) | JP2018-242571 |
| Dec. 27, 2018 | (JP) | JP2018-244946 |
| Dec. 27, 2018 | (JP) | JP2018-245765 |

(51) Int. Cl.
| B60K 1/04 | (2019.01) |
| B60L 50/50 | (2019.01) |
| B62D 21/15 | (2006.01) |
| B62D 25/08 | (2006.01) |
| B60K 1/00 | (2006.01) |

(52) U.S. Cl.
CPC ............. *B60K 1/04* (2013.01); *B60L 50/50* (2019.02); *B62D 21/152* (2013.01); *B62D 25/08* (2013.01); *B60K 2001/001* (2013.01); *B60K 2001/0411* (2013.01)

(58) Field of Classification Search
CPC ......... B60K 1/04; B60L 50/50; B62D 21/152; B62D 25/08
See application file for complete search history.

(56) References Cited

U.S. PATENT DOCUMENTS

| 6,101,794 A * | 8/2000 | Christopherson | A01D 75/30 |
| | | | 280/124.179 |
| 2005/0126145 A1* | 6/2005 | Hunt | B60K 7/0007 |
| | | | 56/11.9 |
| 2009/0000839 A1* | 1/2009 | Ishii | A01D 34/43 |
| | | | 180/65.51 |
| 2014/0238766 A1* | 8/2014 | Hasuda | B60W 10/02 |
| | | | 180/233 |
| 2015/0359168 A1* | 12/2015 | Higashikawa | A01D 34/82 |
| | | | 56/14.7 |
| 2016/0014954 A1* | 1/2016 | Dwyer | F02D 41/021 |
| | | | 56/10.2 J |
| 2018/0026244 A1 | 1/2018 | Ito et al. | |
| 2019/0075724 A1* | 3/2019 | Becke | H01M 10/488 |

FOREIGN PATENT DOCUMENTS

| JP | 2013248918 A | 12/2013 |
| JP | 201554620 A | 3/2015 |
| JP | 201724710 A | 2/2017 |

* cited by examiner

*Primary Examiner* — John D Walters
*Assistant Examiner* — James J Triggs
(74) *Attorney, Agent, or Firm* — The Webb Law Firm

(57) ABSTRACT

An electric work vehicle includes front wheels and rear wheels for traveling, right and left machine body frames extending along a front/rear direction and an electric motor. The electric motor includes at least one of a front output shaft protruding forwards and a rear output shaft protruding rearwards. The electric motor is supported to front portions of the machine body frames to be located forwardly of the front wheels as seen in a side view.

18 Claims, 14 Drawing Sheets

ELECTRIC WORK VEHICLE ARRANGEMENT

CROSS-REFERENCE TO RELATED APPLICATIONS

This application claims priority to Japanese Patent Application No. 2018-242571 filed Dec. 26, 2018, and Japanese Patent Application Nos. 2018-244946 and 2018-245765, both filed Dec. 27, 2018, the disclosures of which are hereby incorporated by reference in their entirety.

BACKGROUND OF THE INVENTION

1. Field of the Invention

This invention relates to an electric work vehicle which employs an electric motor as a prime mover.

2. Description of the Related Art (1) First Related Art

JP 2017-024710 A discloses a riding electric tractor as an example of an electric work vehicle. In its configuration, right and left machine body frames are provided, and an electric motor is supported to front portions of the machine body frames. An output shaft of the electric motor protrudes rearwards. A transmission shaft coupled to the output shaft of the electric motor extends to the rear side to be coupled to an input shaft of a transmission case.

With the above-described configuration in operation, power of the electric motor is transmitted via the transmission shaft to a speed changer device disposed inside the transmission case, and power from this speed changer device is transmitted to the rear wheels.

At a rear portion of the transmission case, a PTO shaft is mounted to protrude rearwards. Power taken off the speed changer device is transmitted to this PTO shaft. Then, the power from the PTO shaft is transmitted to a rotary cultivator mounted at a rear portion of the electric tractor, thus driving the rotary cultivator.

In JP 2017-024710 A, it is assumed that an implement such as the rotary cultivator is mounted at a rear portion of the transmission case. So, in order to transmit power to this implement mounted at a rear portion of the electric tractor, the PTO shaft is arranged to protrude rearwards, at the rear portion of the transmission case.

Further, there exists an electric work vehicle designed based on an assumption of an implement being mounted between the front wheels and the rear wheels. There also exists an electric work vehicle assuming an implement being mounted at a front portion of a machine body frame.

In such electric work vehicles, in case an implement is mounted between the front wheels and the rear wheels or an implement is mounted at a front portion of the machine body frame, there is a need for an arrangement that allows transmission of power of the electric motor to the implement appropriately.

(2) Second Related Art

In the electric tractor disclosed in JP 2017-024710 A, the electric motor is supported to front portions of the right and left machine body frames. Also, a front support frame and a rear support frame are disposed with a space in the front/rear direction therebetween and connected to/between the front portions of the right and left machine body frames.

The electric motor is disposed between the right and left machine body frames. A rear portion of the electric motor is bolt-connected to the rear support frame, a front portion of the electric motor is bolt-connected to the front support frame, and a right portion and a left portion of the electric motor are placed in contact with the right and left frame body frames.

In JP 2017-024710 A, since the implement such as the rotary cultivator is supported to rear portions of the machine body frames, the front/rear balance of the electric work vehicle is adjusted by attaching a balance weight to a front portion of the machine body frames.

In this case, if the electric motor is supported to front portions of the machine body frames, this electric motor functions as a balance weight, thus being advantageous in adjustment of the front/rear balance of the electric work vehicle. Then, there is a need for an arrangement that allows an electric motor to achieve a function of a balance weight effectively in case the electric motor is supported to front portions of the machine body frames.

(3) Third Related Art

In the electric tractor disclosed in JP 2017-024710 A, there are provided the right and left machine body frames and to the front portions of the machine body frames, an electric motor as a prime mover for the implement or a prime mover for traveling is supported. And, the output shaft of the electric motor is arranged to extend rearwards and the transmission shaft for transmitting power to the transmission case is connected via a coupling to the output shaft of the electric motor.

With the above arrangement, when the electric motor is to be mounted to the machine body frames, it is necessary to align the position of the output shaft of the electric motor with the position of the transmission shaft with holding the transmission shaft temporarily so as not to change the position of this transmission shaft and to connect the output shaft of the electric motor to the transmission shaft. In this way, the electric motor needs to be mounted to the machine body. Therefore, there remains room for improvement in the respect of readiness of the work at the time of mounting of the electric motor. Namely, in an electric work vehicle, there is a need for improvement in the readiness of work at time of mounting of an electric motor to a machine body frame.

SUMMARY OF THE INVENTION (1) In Correspondence with First Related Art, there is Proposed a Configuration as Follows.

An electric work vehicle comprising:

front wheels and rear wheels for traveling:

right and left machine body frames extending along a front/rear direction; and an electric motor, the electric motor having either one of a front output shaft protruding forwards or a rear output shaft protruding rearwards, the electric motor being supported to front portions of the machine body frames to be located forwardly of the front wheels as seen in a side view.

With the above-described configuration, when an implement is mounted between the front wheels and the rear wheels, it is possible to arrange such that the power of the rear output shaft of the electric motor is transmitted via a transmission shaft, etc. to the implement. Whereas, when an implement is mounted to front portions of the machine body frames, it is possible to arrange such that the power of the front output shaft of the electric motor is transmitted via a transmission shaft, etc. to the implement.

As described above, power of the electric motor can be transmitted to the implement, in appropriate correspondence with both the situation of the implement being mounted between the front wheels and the rear wheels and the situation of the implement being mounted to front portions of the machine body frames. As a result, the working efficiency of the electric work vehicle can be improved.

According to one preferred embodiment, an upper end portion of the electric motor is disposed at a position lower than upper end portions of the front portions of the machine body frames, as seen in a side view.

With the above-described configuration, as the electric motor is disposed at a low position, there is achieved an advantage with respect to lowering of the gravity center of the electric work vehicle.

According to one preferred embodiment, a lower end portion of the electric motor is disposed at a position lower than lower end portions of the front portions of the machine body frames, as seen in a side view.

According to one preferred embodiment;
a rotational axis of the front wheels is disposed at a position lower than lower end portions of the front portions of the machine body frames, as seen in a side view; and
the lower end portion of the electric motor is disposed at a position lower than the rotational axis of the front wheels, as seen in a side view.

With either one of the above-described configurations, as the electric motor is disposed at an even lower position, there is achieved an advantage with respect to further lowering of the gravity center of the electric work vehicle.

According to one preferred embodiment, axes of the front output shaft and the rear output shaft of the electric motor are disposed at positions which are lower than the upper end portions of the front portions of the machine body frames and which also are higher than the rotational axis of the front wheels.

With the above-described configuration, the motor can be disposed at a favorable position, with consideration to favorable balance between the respect of gravity center lowering and the respect of ensuring a minimal ground clearance for the electric work vehicle.

(2) In Correspondence with Second Related Art, there is Proposed a Configuration as Follows.

An electric work vehicle comprising:
right and left machine body frames extending along a front/rear direction;
a support frame connected to/between front portions of the right and left machine body frames; and
an electric motor for feeding power to at least one of a traveling device and an implement, the electric motor being connected to the support frame in such a manner as to protrude forwards from front end portions of the machine body frames as seen in a side view, and being supported to the right and left machine body frames via the support frame.

With the above-described configuration, in case the electric motor is supported to the front portions of the machine body frames, this electric motor is supported in such a manner as to protrude forwards from the front end portions of the machine body frame. Therefore, it is readily possible to secure a large amount of overhang of the electric motor, thus being advantageous in readiness of adjustment of the front/rear balance of the electric work vehicle being made possible. And, the electric motor can be disposed easily in such a manner as to protrude forwards from the front end portions of the machine body frames.

Further, the support frame is connected to/between the front portions of the right and left machine body frames, the electric motor is connected to the support frame, and this electric motor is supported via the support frame to the right and left machine body frames. With this, the electric motor can be disposed easily without much trouble at a position between the right machine body frame and the left machine body frame and the electric motor can be readily disposed in such a manner as to protrude forwards from the front end portions of the machine body frames.

According to one preferred embodiment, an upper end portion of the electric motor is disposed at a position lower than upper end portions of the front portions of the machine body frames, as seen in a side view.

With the above-described configuration, as the electric motor is disposed at a position relatively low relative to the machine body frames, there is achieved an advantage with respect to lowering of the gravity center of the electric work vehicle.

According to one preferred embodiment, a lower end portion of the electric motor is disposed at a position higher than lower end portions of the front portions of the machine body frame as seen in a side view.

With the above-described configuration, since the electric motor does not protrude downwards beyond the lower end portions of the front portions of the machine body frames, thus being advantageous in securing the minimal ground clearance for the electric work vehicle.

According to one preferred embodiment, the electric work vehicle further comprises:
right and left reinforcement frames connected to the front portions of the right and left machine body frames and extending forwards;
a front reinforcement frame connected to/between front portions of the right and left reinforcement frame and disposed forwardly of the electric motor;
the right reinforcement frame and the electric motor being disposed with a predetermined space therebetween, with the right reinforcement frame being disposed on the outer side, as seen in a plan view; and
the left reinforcement frame and the electric motor being disposed with a predetermined space therebetween, with the left reinforcement frame being disposed on the outer side, as seen in a plan view.

With the above-described configuration, the front reinforcement frame and the reinforcement frames are disposed to surround the electric motor and connected to the front portions of the right and left machine body frames. Thus, with the front reinforcement frame and the reinforcement frames, the front portions of the machine body frames and the vicinity of the support frame are reinforced, so that supporting strength of the electric motor can be achieved.

Also, the reinforcement frames and the electric motor are spaced apart from each other in the right/left direction as seen in the plan view. This arrangement serves to facilitate flow of air between the reinforcement frames and the electric motor, thus being advantageous in the respect of promotion of heat discharge of the electric motor.

Further, in laying out a harness or a cooling hose to be connected to the electric motor, the space between the reinforcement frames and the electric motor can be utilized, so that such harness and/or cooling hose can be disposed easily and smoothly.

According to one preferred embodiment, the electric work vehicle further comprises:
right and left upper reinforcement frames connected to upper portions of the front portions of the right and left machine body frames and extending forwards;
right and left lower reinforcement frames connected to lower portions of the front portions of the right and left machine body frames and extending forwards;

a front reinforcement frame connected to/between front portions of the right and left upper reinforcement frames and front portions of the right and left lower reinforcement frames and disposed forwardly of the electric motor;

the right upper reinforcement frame, the right lower reinforcement frame and the electric motor being disposed with a predetermined space therebetween, with the right upper reinforcement frame and the right lower reinforcement frame being disposed on the outer side, as seen in a plan view; and the left upper reinforcement frame, the left lower reinforcement frame and the electric motor being disposed with a predetermined space therebetween, with the left upper reinforcement frame and the left lower reinforcement frame being disposed on the outer side, as seen in a plan view.

With the above-described configuration, the front reinforcement frame, the upper reinforcement frames and the lower reinforcement frames are disposed to surround the electric motor and connected to the front portions of the right and left machine body frames. Thus, with the front reinforcement frame, the upper reinforcement frames and the lower reinforcement frames, the front portions of the machine body frames and the vicinity of the support frame are reinforced, so that supporting strength of the electric motor can be achieved.

Also, the upper reinforcement frames, the lower reinforcement frames and the electric motor are spaced apart from each other in the right/left direction as seen in the plan view. This arrangement serves to facilitate flow of air between the upper reinforcement frames, the lower reinforcement frames and the electric motor, thus being advantageous in the respect of promotion of heat discharge of the electric motor.

Further, in laying out a harness or a cooling hose to be connected to the electric motor, the space between the upper reinforcement frames, the lower reinforcement frames and the electric motor can be effectively utilized, so that such harness and/or cooling hose can be disposed easily and smoothly.

According to one preferred embodiment, the upper reinforcement frames and the lower reinforcement frames are disposed with a predetermined space therebetween as seen in the side view.

With the above-described configuration, the upper reinforcement frames and the lower reinforcement frames are spaced apart from each other in the vertical direction as seen in the side view. With this, air can flow easily between the upper reinforcement frames and the lower reinforcement frames, thus being advantageous in the respect of heat discharge of the electric motor.

Further, in laying out a harness or a cooling hose to be connected to the electric motor, the space between the upper reinforcement frames and the lower reinforcement frames can be effectively utilized, so that such harness and/or cooling hose can be disposed easily and smoothly.

According to one preferred embodiment, a front portion of the electric motor is connected to the front reinforcement frame.

With the above-described configuration, in addition to the electric motor being supported via the support frame to the right and left machine body frames, the electric motor is supported also the front reinforcement frame and the reinforcement frames (the upper reinforcement frames, the lower reinforcement frames), improvement of the supporting strength of the electric motor can be achieved.

(3) In Correspondence with Third Related Art, there is Proposed a Configuration as Follows.

An electric work vehicle comprising:

right and left machine body frames extending along a front/rear direction;

a front support frame connected to/between front portions of the right and left machine body frames;

a support member connected to the front support frame;

a front transmission shaft for transmitting power along the front/rear direction, the front transmission shaft being rotatably supported to the support member; and an electric motor having a rearwardly oriented output shaft;

wherein the output shaft is supported to a portion of the front transmission shaft which portion is supported to the support member; and a portion of the electric motor on the side of the output shaft is connected to the support member.

With the above-described configuration, the front transmission shaft for transmitting power is supported to the right and left machine body frames via the support member and the front support frame. No change occurs in the position of the transmission shaft. Under this condition, by simply connecting the output shaft of the electric motor to the portion of the front transmission shaft supported to the support member, the output shaft of the electric motor can be connected to the front transmission shaft smoothly and easily.

Further, in addition to connecting the output shaft of the electric motor to the portion of the front transmission shaft supported to the support member, by connecting the portion of the electric motor on the side of the output shaft to the support member, the condition of the electric motor being supported to the right and left machine body frames via the support member and the front support frame can be obtained easily and smoothly.

Moreover, the front support frame connected to/between the right and left machine body frames provides the function as a reinforcement member for the right and left machine body frames, in addition to the function of supporting the support member (the front transmission shaft).

As described above, while the output shaft of the electric motor can be connected smoothly and easily to the front transmission shaft, the condition of the electric motor being supported to the right and left machine body frames can be obtained easily and smoothly, so that the readiness of operation in mounting the electric motor to the machine body frames can be improved. Moreover, the front support frame provides also the function as a reinforcement member for the right and left machine body frames, thus being advantageous with respect to improvement of the strength of the front portions of the right and left machine body frames.

According to one preferred embodiment:

the support member is connected to the front support frame to protrude forwards from the front support frame;

a portion of the electric motor on the side of the output shaft is connected to a front end portion of the support member; and the front support frame and the portion of the electric motor on the side of the output shaft are disposed with a predetermined space therebetween.

With the above-described configuration, when the portion of the electric motor on the side of the output shaft is connected to a front end portion of the support member, the front support frame and the portion of the electric motor on the side of the output shaft are spaced from each other. This arrangement serves to facilitate flow of air between the front support frame and the portion of the electric motor on the side of the output shaft, thus being advantageous for promotion of heat discharge from the electric motor.

According to one preferred embodiment, the electric work vehicle further comprises a motor frame connected to/between a portion of the electric motor opposite to the output shaft and the right and left machine body frames.

With the above-described configuration, in addition to the portion of the electric motor on the side of the output shaft, the portion of the electric motor opposite to the output shaft is also supported via the motor frame to the right and left machine body frames. So, the supporting strength for the electric motor can be increased.

Further, the motor frame connected to/between the right and left machine body frames provides the function as a reinforcement member for the right and left machine body frames, in addition to its function of supporting the electric motor, thus being advantageous for improvement of the strength of the front portions of the right and left machine body frames.

According to one preferred embodiment, the electric work vehicle further comprises:

a rear transmission shaft connected via a universal joint to a rear end portion of the front transmission shaft; and a rear support frame disposed on the rear side of the front support frame and connected to/between the right and left machine body frames;

wherein a front portion of the front transmission shaft is rotatably supported to the support member, and a rear portion of the front transmission shaft is rotatably supported to the rear support frame.

In case the front transmission shaft is connected to the output shaft of the electric motor, it may be arranged such that a rear transmission shaft is connected via a universal joint to the rear end portion of the front transmission shaft and the rear transmission shaft is extended rearwards to be connected to an input shaft of an implement or an input shaft of a transmission case.

With the above-described configuration, since the front portion and the rear portion of the front transmission shaft are supported to the front support frame and the rear support frame, the supporting strength of the front transmission shaft can be improved.

Further, since the rear support frame connected to/between the right and left machine body frames provides also the function as a reinforcement member for the right and left machine body frames, in addition to its function of supporting the rear portion of the front transmission shaft, thus the arrangement is advantageous in the respect of improvement of the strength of the front portions of the right and left machine body frames.

According to one preferred embodiment, the electric work vehicle further comprises:

a front wheel support frame supporting right and left front wheels steerably;

wherein the front wheel support frame is rollably supported to a portion of the front transmission shaft which portion is located between the front support frame and the rear support frame.

With the above-described configuration, since the front wheel support frame supporting the right and left front wheels is rollably supported to the front transmission shaft, the front transmission shaft acts also as a support member for the front wheel support frame. So, this configuration is advantageous for configuration simplification.

Moreover, since the front portion and the rear portion of the front transmission shaft are supported by the front support frame and the rear support frame, the supporting strength of the front transmission shaft is high.

Further, since the front wheel support frame is rollably supported to the portion of the front transmission shaft located between the front support frame and the rear support frame, the supporting strength of the front wheel support frame is also high.

According to one preferred embodiment:

the respective machine body frame defines a cutout portion that allows rolling movement of the front wheel support frame with introduction of the front wheel support frame therein;

at a portion of the machine body frame forwardly of the cutout portion, the front support frame is connected; and at a portion of the machine body frame rearwardly of the cutout portion, the rear support frame is connected.

In the case of the arrangement of rollably supporting the front wheel support frame, in order to avoid interference between the front wheel support frame and the right and left machine body frames, a cutout portion that allows rolling movement of the front wheel support frame with introduction of the front wheel support frame therein may be provided in the right/left machine body frame.

With the above-described configuration, since the front support frame and the rear support frame are supported respectively at the portions forwardly and rearwardly of the cutout portion of the right/left machine body frame, the vicinity portions of the cutout portions in the right and left machine body frames are reinforced by the front support frame and the rear support frame.

With this, it is possible to suppress reduction in the strength of the vicinity portions of the cutout portions in the right and left machine body frames, thus being advantageous for improvement of the strength of the front portions of the right and left machine body frames.

DETAILED DESCRIPTION OF THE PREFERRED EMBODIMENTS

In the respective embodiment, a sign "F" denotes "front direction", a sign "B" denotes "rear direction", a sign "U" denotes an upper direction, a sign "D" denotes "lower direction", a sign "R" denotes "right direction" and a sign "L" denotes "left direction", respectively.

First Embodiment (General Configuration of Electric Grass Cutting Machine)

Figure 1:
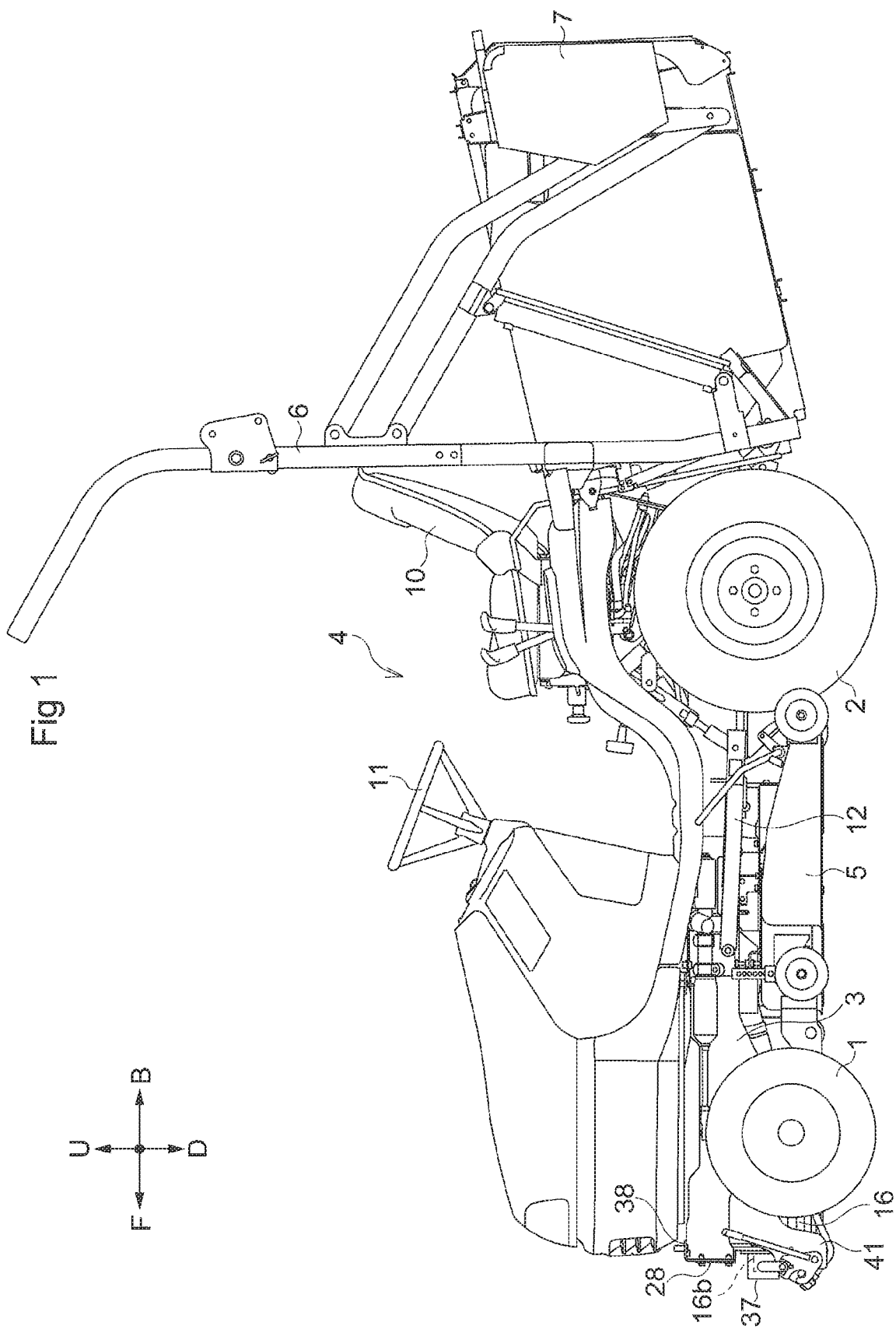
FIG. 1 is a left side view of an electric grass cutting machine (an example of an "electric work vehicle" in each embodiment) according to a first embodiment (same is true with subsequent drawings up to FIG. 5)
Figure 2:
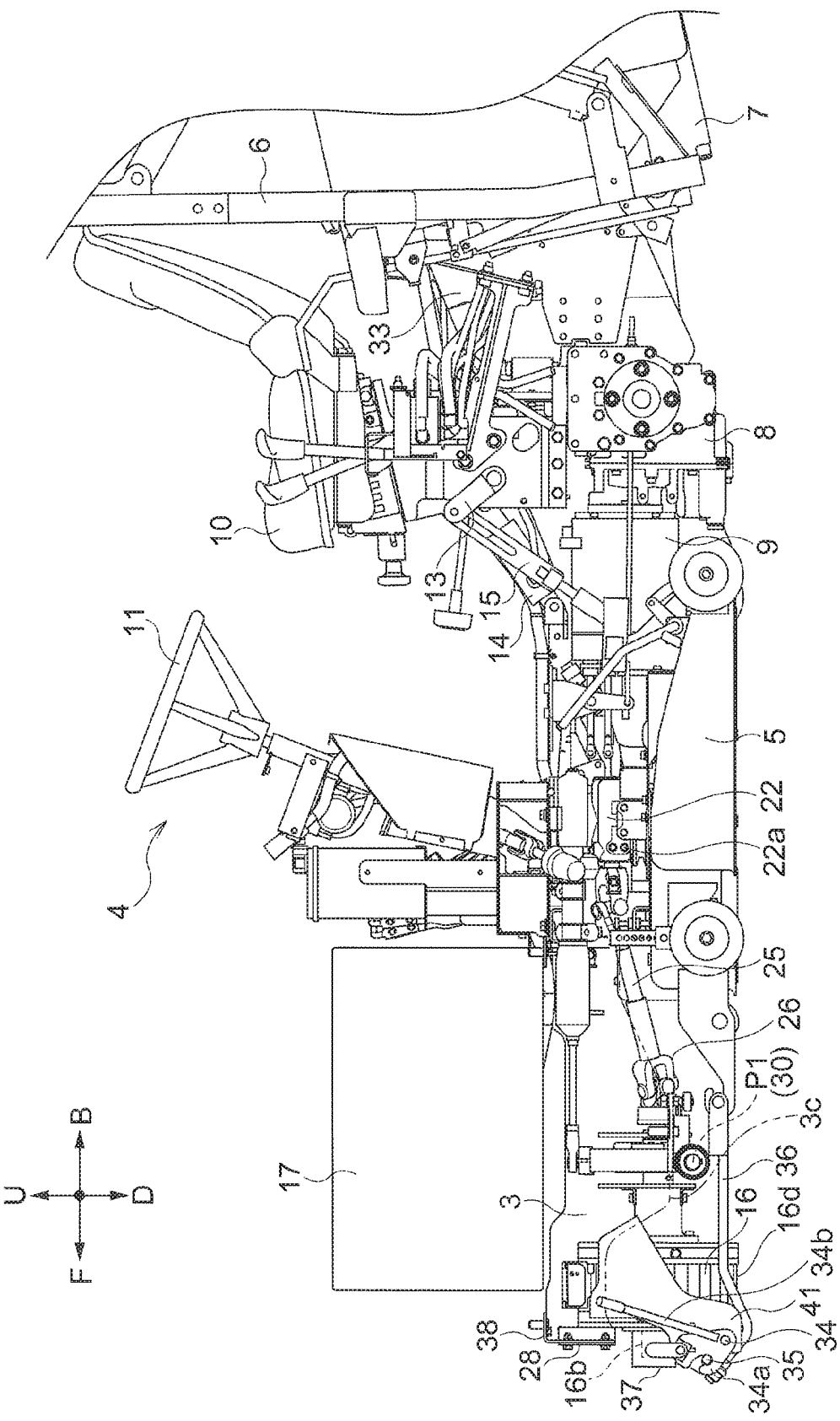
FIG. 2 is a left side view showing the inside of the electric grass cutting machine.

As shown in FIG. 1 and FIG. 2, right and left machine body frames 3 are disposed along the front/rear direction, and at front portions of the machine body frames 3, right and left front wheels 1 are supported; and at rear portions of the machine body frames 3, right and left rear wheels 2 are supported.

Upwardly of the rear portions of the machine body frames 3, a driving section 4 is supported. On the machine body frames 3 and between the front wheels 1 and the rear wheels 2, a mower 5 is supported. At rear portions of the machine body frames 3, a rollover protection structure (ROPS) frame 6 is provided and a grass collecting section 7 is supported to this ROPS frame 6.

The above-described arrangements constitute a riding type electric grass cutting machine.

(Configuration of Rear Portion of Electric Grass Cutting Machine)

As shown in FIG. 1 and FIG. 2, to rear portions of the machine body frames 3, a transmission case 8 is connected; and to this transmission case 8, the right and left rear wheels 2 are supported. An electric motor 9 for traveling is disposed under a rear orientation and connected to a front portion of the transmission case 8. With power from the electric motor 9, the rear wheels 2 are driven.

To a rear portion of the transmission case 8, the ROPS frame 6 is connected. A driver's seat 10 and a steering wheel 11 for steering the front wheels 1 are provided in the driving section 4.

(Supporting Arrangement of Mower)

As shown in FIG. 1 and FIG. 2, the mower 5 is of a type in which three blades (not shown) rotatably driven about vertical axes are disposed side by side along the right/left direction.

Front portions of right and left support links 12 are supported to be vertically pivotable about axes extending in the right/left direction of the machine body frames 3. The support links 12 extend rearwards and the mower 5 is connected to rear portions of the support links 12.

As shown in FIGS. 1 through 4, right and left support brackets 41 are connected to front portions of the machine body frames 3, and an operational shaft 34 is rotatably supported to/between the support brackets 41. To a right end portion and a left end portion of the operational shaft 34, hook-like support members 34a are connected, and an operational lever 34b is connected to the left support member 34a.

Figure 3:
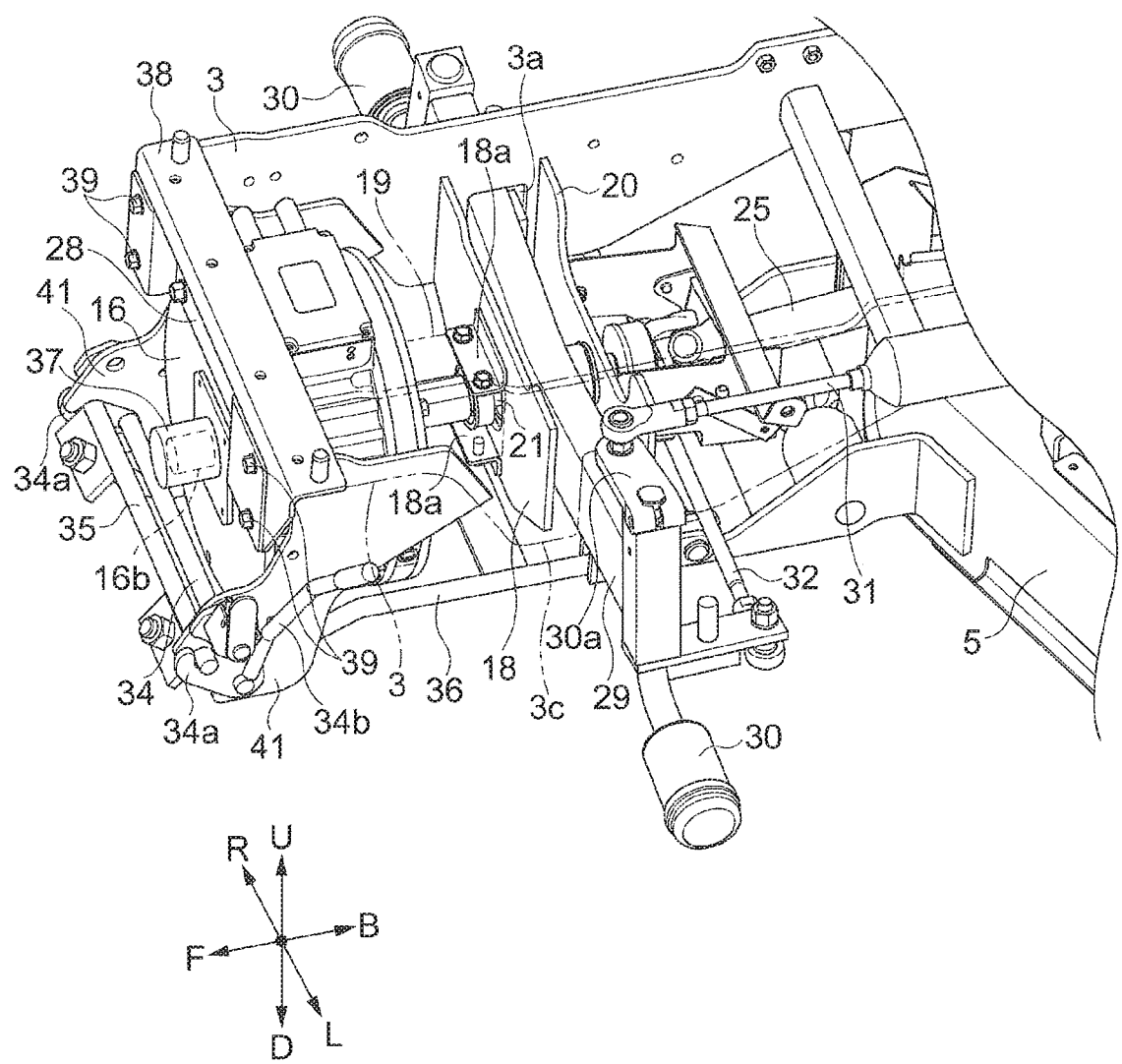
FIG. 3 is an exploded perspective view showing vicinities of a front portion of a machine body frame and an electric motor.
Figure 4:
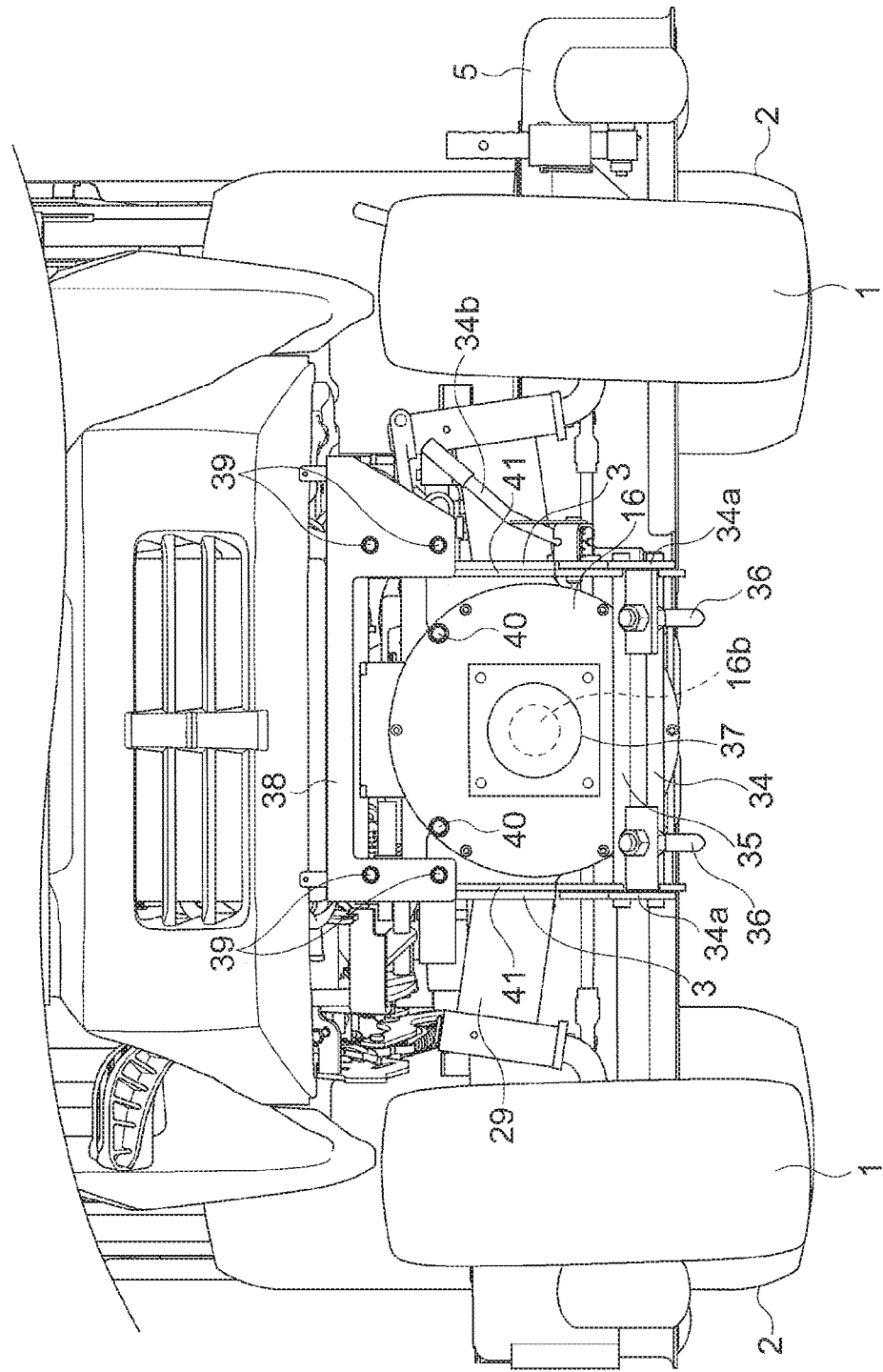
FIG. 4 is a front view showing vicinities of the front portion of the machine body frame and the electric motor.

To a right portion and a left portion of a support shaft 35 disposed along the right/left direction, support links 36 are connected and extend rearwards. The condition illustrated in FIGS. 2, 3 and 4 is a condition in which the right portion and the left portion of the support shaft 35 are rotatably supported to the support members 34a of the operational shafts 34 and the support links 36 extend rearwards to be connected to the mower 5.

As shown in FIG. 2, vertically pivotable right and left operational arms 13 are provided and lift cylinders 14 are provided for pivotally operating the operational arms 13. A coupling link 15 is connected to/between the respective operational arm 13 and the rear portion of the respective support link 12. In operation, as the respective operational arm 13 is pivotally operated vertically by the lift cylinder 14, the mower 5 is lifted up/down.

(Electric Motor for Driving Mower)

As shown in FIGS. 1 through 4, an electric motor 16 for driving the mower 5 is supported to front portions of the machine body frames 3 to be located forwardly of the front wheels 1 as seen in a side view. A battery 17 for supplying electric power to the electric motors 9, 16 is supported to an upper portion of the front portions of the machine body frames 3.

Figure 5:
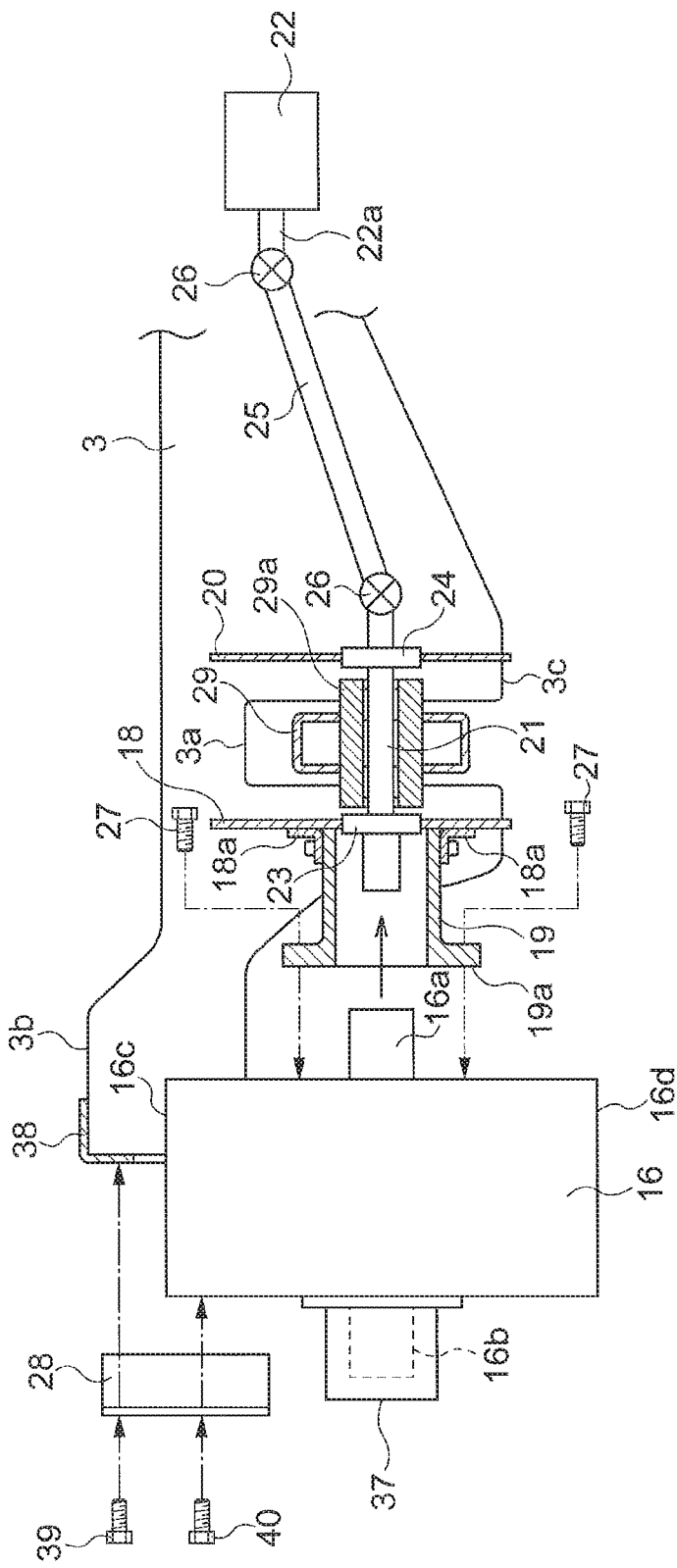
FIG. 5 is an exploded side view in vertical section showing vicinities of the front portion of the machine body frame and the electric motor.

As shown in FIG. 5, the electric motor 16 is provided with its front output shaft 16b protruding forwards and its rear output shaft 16a protruding rearwards. The condition shown in FIGS. 1 through 5 is a condition in which a cover 37 is attached for covering the front output shaft 16b of the electric motor 16.

(Supporting Arrangement for Electric Motor Driving Mower)

As shown in FIG. 3 and FIG. 5, to/between front portions of the right and left machine body frames 3, a support frame 18 in the form of a flat plate is connected. To a flange portion 18a of the front face portion of the support frame 18, a support member 19 in the form of an angular tube is bolt-connected to protrude forwards from the support frame 18. A support frame 20 in the form of a flat plate is connected to/between front portions of the right and left machine body frames 3 and is disposed on the rear side of the support frame 18.

As shown in FIGS. 3, 4 and 5, to/between upper portions of the front end portions of the right and left machine body frames 3, a support frame 38 is connected. A connecting member 28 formed by bending a flat plate is connected to the support frame 38 with bolts 39.

As shown in FIG. 3 and FIG. 5, a front transmission shaft 21 is disposed along the front/rear direction, wherein a front portion of this front transmission shaft 21 is rotatably supported by a bearing 23 inside the support member 19, and a rear portion of the front transmission shaft 21 is rotatably supported by a bearing 24 to the support frame 20.

An input case 22 for transmitting power to the blades of the mower 5 is provided at the right/left center portion of the mower 5 and an input shaft 22a of the input case 22 extends forwards. To the rear end portion of the front transmission shaft 21, a front end portion of a rear transmission shaft 25 is connected via a universal joint 26 and a rear end portion of the rear transmission shaft 25 is connected to the input shaft 22a of the input case 22 via the universal joint 26.

(Supporting Process of Electric Motor Driving Mower)

As shown in FIGS. 3, 4 and 5, the connecting member 28 will be detached from the support frame 38. Then, by operating the operational lever 34b of the operational shaft 34 forwards, the support member 34a of the operational shaft 34 is operated to the front side, whereby the support shaft 35 and the support link 36 will be detached from the support member 34a of the operational shaft 34.

Under the above-described condition, with the front output shaft 16b of the electric motor 16 being oriented forwards and the rear output shaft 16a of the electric motor 16 being oriented rearwards, the electric motor 16 will be passed between the front portions of the right and left machine body frames 3 (between the right and left support brackets 41), and passed between the support frame 28 and the operational shaft 34.

Next, the rear output shaft 16a of the electric motor 16 will be inserted into the support member 19. Inside the support member 19, to the portion of the front transmission shaft 21 supported to the support member 19 (bearing 23), the rear output shaft 16a of the electric motor 16 will be connected. The rear output shaft 16a of the electric motor 16 and the front output shaft 21 are connected via a spline arrangement.

When the rear output shaft 16a of the electric motor 16 has been inserted into the support member 19 and connected to the front transmission shaft 21, the portion of the electric motor 16 on the side of the output shaft 16a will be placed in contact with the flange portion 19a of the support member 19, so that the portion of the electric motor 16 on the side of the rear output shaft 16a and the flange portion 19a of the support member 19 will be connected to each other with bolts 27.

With the above, the portion of the electric motor 16 on the side of the rear output shaft 16a will be connected to the front end portion (flange portion 19a) of the support member 19; and the support frame 18 and the portion of the electric motor 16 on the side of the rear output shaft 16a will be disposed with a space therebetween that corresponds to the length of the support member 19.

After establishment of connection between the portion of the electric motor 16 on the side of the rear output shaft 16a and the flange portion 19a of the support member 19, the connecting member 28 will be connected to the support frame 38 with the bolts 39 and the connecting member 28 will be connected to an upper portion of the portion of the electric motor 16 on the side of the front output shaft 16b (cover 37) with bolts 40. The support shaft 35 and the support links 36 will be attached as shown in FIGS. 1 through 4.

With the above-described configuration, the electric motor 16 is supported to the right and left machine body frames 3 via the support member 19 and the support frame 18 and supported to the right and left machine body frames 3 via the connecting member 28 and the support frame 38.

Power of the electric motor 16 is transmitted to the input shaft 22a of the input case 22 from the rear output shaft 16a of the electric motor 16 via the front transmission shaft 21 and the rear transmission shaft 25, whereby the blades of the mower 5 are rotatably driven. As shown in FIG. 1 and FIG. 2, cut grass pieces cut by the mower 5 will be conveyed and fed to the grass collecting portion 7 through a duct 33 disposed on the lateral side of the electric motor 9 and the upper side of the transmission case 8.

(Position Relations between Electric Motor Driving Mower and Respective Portions)

As shown in FIG. 1 and FIG. 2, when the electric motor 16 is supported to the machine body frames 3, this electric motor 16 is disposed forwardly of the front wheels 1 as seen in the side view.

As shown in FIG. 5, an upper end portion 16c of the electric motor 16 is disposed at a position lower than an upper end portion 3b of the front portion of the machine body frame 3 as seen in the side view. Whereas, a lower end portion 16d of the electric motor 16 is disposed at a position lower than the lower end portion 3c of the front portion of the machine body frame 3 as seen in the side view.

As shown in FIGS. 2, 3 and 5, a rotational axis P1 of the front wheel 1 (the front wheel support portion 30) is disposed at a position lower than the lower end portion 3c of the front portion of the machine body frame 3 as seen in the side view; and the lower end portion 16d of the electric motor 16 is disposed at a position lower than the rotational axis P1 of the front wheel 1 (front wheel support portion 30) as seen in the side view.

The condition illustrated in FIGS. 1 through 5 is a condition in which power of the electric motor 16 (rear output shaft 16a) is transmitted to the mower 5 mounted between the front wheels 1 and the rear wheels 2.

In case the mower 5 is not mounted between the front wheels 1 and the rear wheels 2, but this mower 5 is to be mounted to front portions of the machine body frames 3 or a different implement (not shown) is to be mounted to the front portions of the machine body frames 3, the rear transmission shaft 25 and the universal joint 26 shown in FIGS. 3 and 5 will be detached and a cover (not shown) for covering the rear portion of the front transmission shaft 21 will be attached.

The cover 37 shown in FIGS. 1-5 will be detached; instead, a transmission shaft (not shown) will be connected to/between an input shaft (not shown) of the mower 5 mounted to the front portions of the machine body frames 3 or an input shaft (not shown) of the different implement and the front output shaft 16b of the electric motor 16.

(Supporting Arrangement for Front Wheels)

As shown in FIGS. 3, 4 and 5, there is provided a front wheel support frame 29 to which the right and left front wheels 1 are supported to be steerable. Right and left front wheel support portions 30 supporting the front wheels 1 are supported to a right portion and a left portion of the front wheel support frame 29 to be steerable.

A steering rod 31 operated along the front/rear direction by the steering wheel 11 is connected to a knuckle arm 30a of the left front wheel support portion 30; and to/between the right and left front wheel support portions 30, a tie rod 32 is connected. In this case, the tie rod 32 passes under the machine body frames 3 and under the universal joint 26 connecting the front transmission shaft 21 with the rear transmission shaft 25.

With the above-described arrangement, when the steering wheel 11 is operated, the steering rod 31 is operated in the front/rear direction, whereby the front wheels 1 (front wheel support portions 30) are steered by the knuckle arm 30a of the left front wheel support portion 30 and the tie rod 32.

(Rolling Supporting Arrangement for Front Wheel Support Frame)

As shown in FIG. 3 and FIG. 5, a cylindrical boss portion 29a is connected to the right/left center portion of the front wheel support frame 29. Onto a portion of the front transmission shaft 21 which portion is located between the support frame 18 and the support frame 20, a boss portion 29a of the front wheel support frame 29 is rotatably engaged and this front wheel support frame 29 is rollably supported to the front transmission shaft 21 to be capable of rolling.

The right and left machine body frames 3 respectively defines a cutout portion 3a which is opened downwards, and as the front wheel support frame 29 is fitted into the cutout portion 3a of the machine body frame 3 from the underside, rolling action of the front wheel support frame 29 is allowed. The positions at which the front wheel support frame 29 comes into abutment against an upper side portion of the cutout portion 3a of the machine body frame 3 are right and left limit positions of rolling of the front wheel support frame 29.

To a portion of the machine body frame 3 adjacent the front side of the cutout portion 3a, the support frame 18 is connected along the vertical direction to follow the cutout portion 3a of the machine body frame 3. To a portion of the machine body frame 3 adjacent the rear side of the cutout portion 3a, the support frame 20 is connected along the vertical direction to follow the cutout portion 3a of the machine body frame 3.

Modifications of First Embodiment (1) Instead of the mower 5, a rotary cultivator (not shown) for cultivating a field or an agent sprayer (not shown) for spraying agent over a field can be mounted as the implement.

(2) The electric motor 16 may incorporate a speed reduction mechanism (not shown), so that the power of the electric motor 16 may be reduced through such speed reduction mechanism and outputted via the rear output shaft 16a and the front output shaft 16b of the electric motor 16.

(3) The electric work vehicle is not limited to the electric grass cutting machine, but may be a riding type electric tractor or the like. These respects are same in the configurations of second and third embodiments to be described later, also.

Second Embodiment (General Configuration of Electric Grass Cutting Machine)

Figure 6:
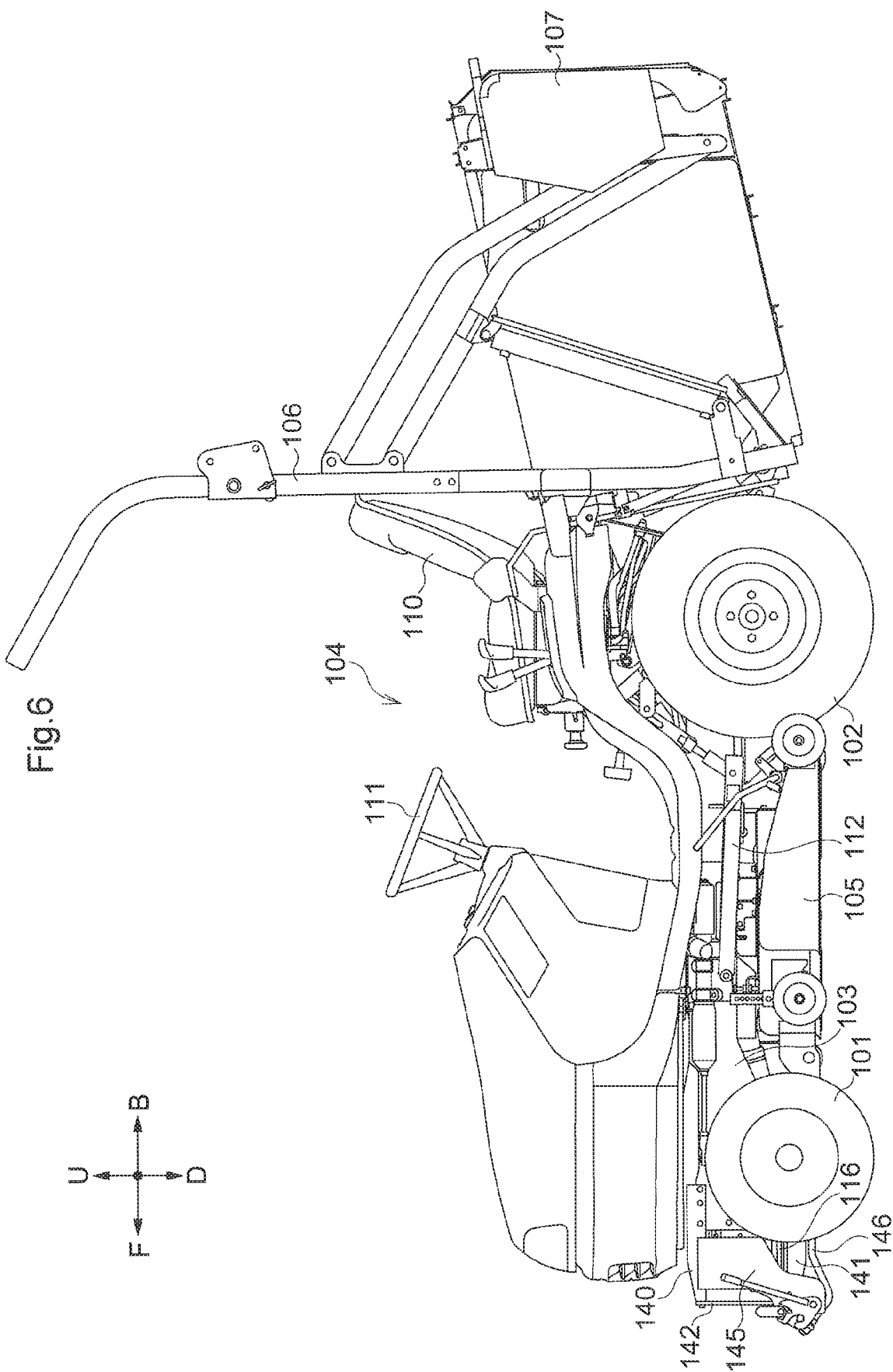
FIG. 6 is a left side view of an electric grass cutting machine according to a second embodiment (same is true with subsequent drawings up to FIG. 10)
Figure 7:
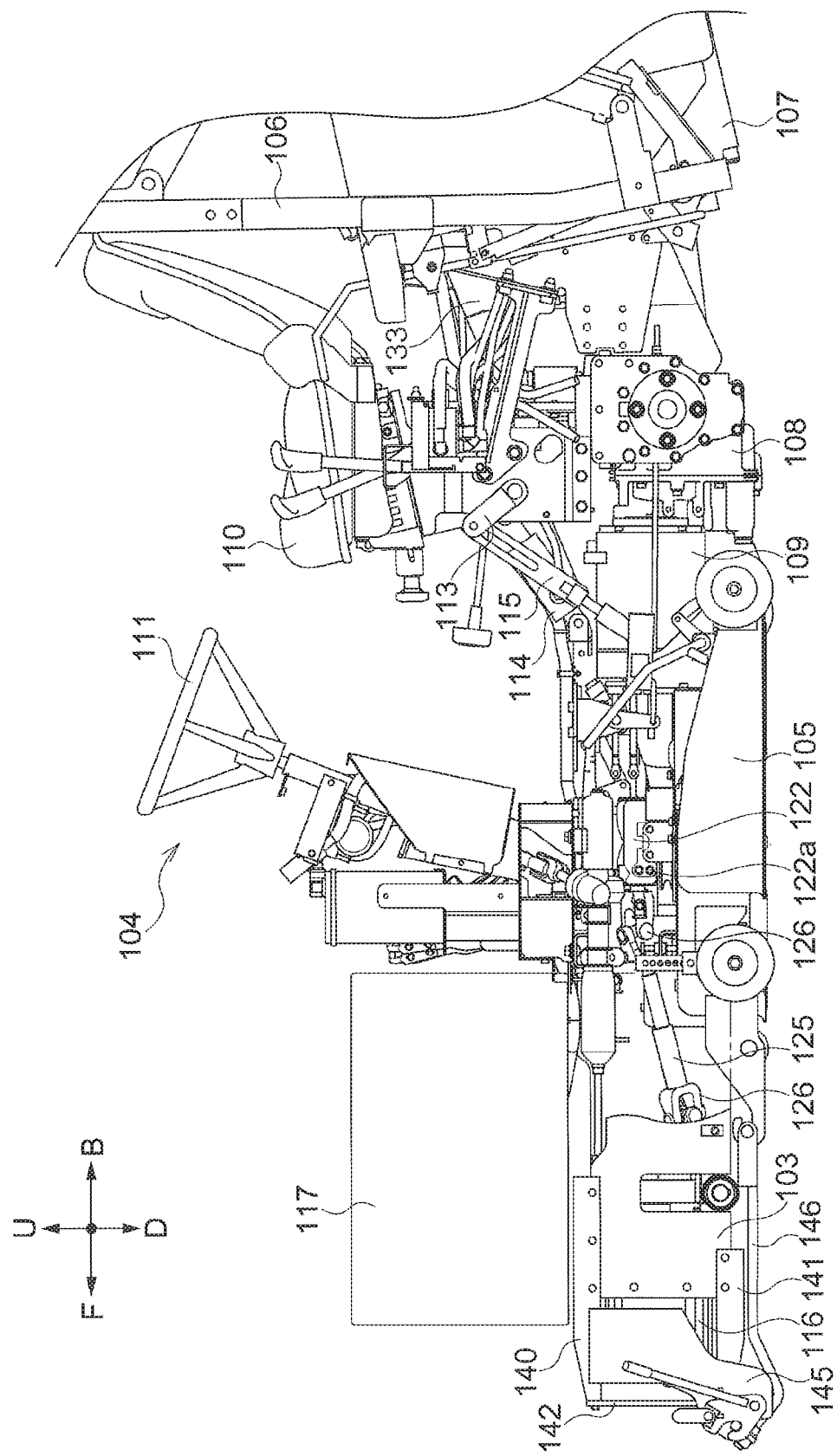
FIG. 7 is a left side view showing the inside of the electric grass cutting machine.

As shown in FIG. 6 and FIG. 7, right and left machine body frames 103 are disposed along the front/rear direction, and at front portions of the machine body frames 103, right and left front wheels 101 (corresponding to a "traveling device") are supported, and at rear portions of the machine body frames 103, right and left rear wheels 102 (corresponding to a "traveling device") are supported.

Upwardly of the rear portions of the machine body frames 103, a driving section 104 is supported. On the machine body frames 103 and between the front wheels 101 and the rear wheels 102, a mower 105 (corresponding to an "implement") is supported. At rear portions of the machine body frames 103, a ROPS frame 106 is provided and a grass collecting section 107 is supported to this ROPS frame 106.

The above-described arrangements constitute a riding type electric grass cutting machine.

(Configuration of Rear Portion of Electric Grass Cutting Machine)

As shown in FIG. 6 and FIG. 7, to rear portions of the machine body frames 103, a transmission case 108 is connected and to this transmission case 108, the right and left rear wheels 102 are supported. An electric motor 109 for traveling is disposed under a rear orientation and connected to a front portion of the transmission case 108. With power from the electric motor 109, the rear wheels 102 are driven.

To a rear portion of the transmission case 108, the ROPS frame 106 is connected. A driver's seat 110 and a steering wheel 111 for steering the front wheels 101 are provided in the driving section 104.

(Supporting Arrangement of Mower)

As shown in FIG. 6 and FIG. 7, the mower 105 is of a type in which three blades (not shown) rotatably driven about vertical axes are disposed side by side along the right/left direction.

Front portions of right and left support links 112 are supported to be vertically pivotable about axes extending in the right/left direction of the machine body frames 103. The support links 112 extend rearwards and the mower 105 is connected to rear portions of the support links 112.

As will be described later (arrangements relating to front reinforcement frame connected to front portion of the machine body frames, and upper reinforcement frame and a lower reinforcement frame), to front portions of the machine body frames 103, right and left upper reinforcement frames 140 are connected; and right and left support brackets 145 are connected to the upper reinforcement frames 140. Right and left support brackets 145 are connected to the upper reinforcement frames 140. To lower portions of the support brackets 145, right and left support links 146 are connected to be vertically pivotable and extend rearwards. And, to rear portions of the support links 146, the mower 105 is connected.

There are provided right and left operational arms 113 which are vertically pivotable. And, lift cylinders 114 for pivotally operating the operational arms 113 are provided, and to/between the operational arms 113 and the rear portions of the support links 112, coupling links 115 are connected. As the operational arm 113 is vertically pivoted by the lift cylinder 114, the mower 105 is lifted up/down.

(Configuration of Front Portion of Machine Body Frame)

Figure 8:
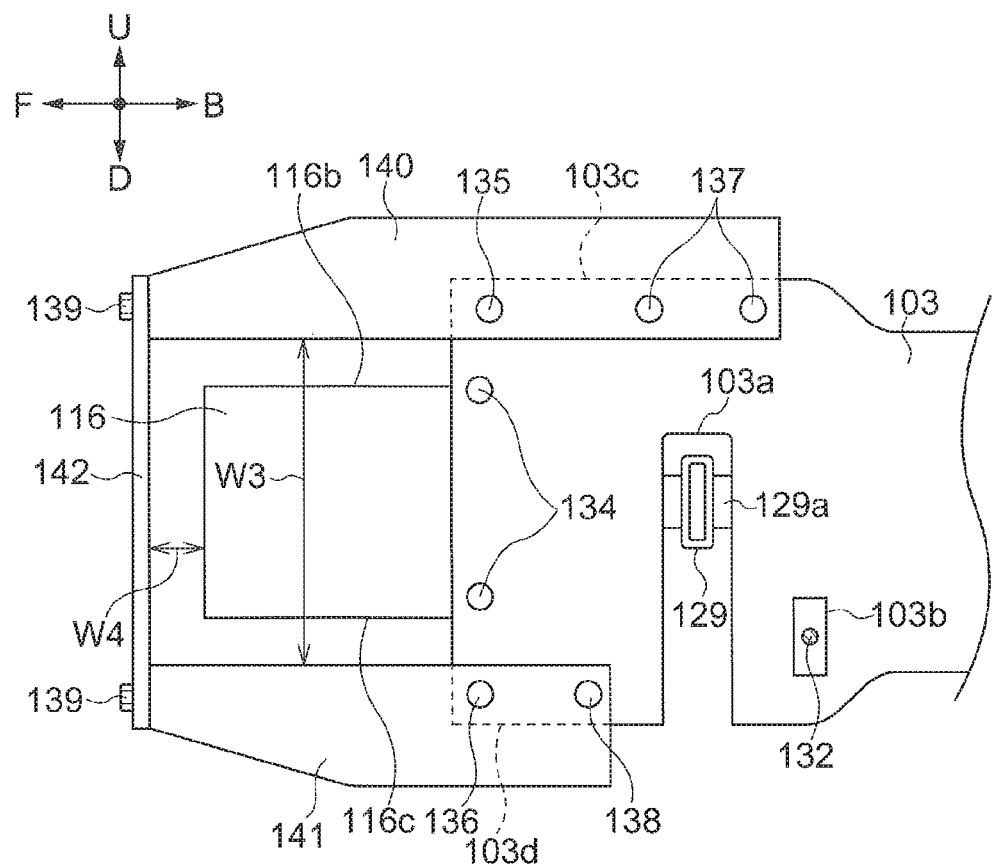
FIG. 8 is a left side view showing vicinities of a front portion of a machine body frame and an electric motor.
Figure 9:
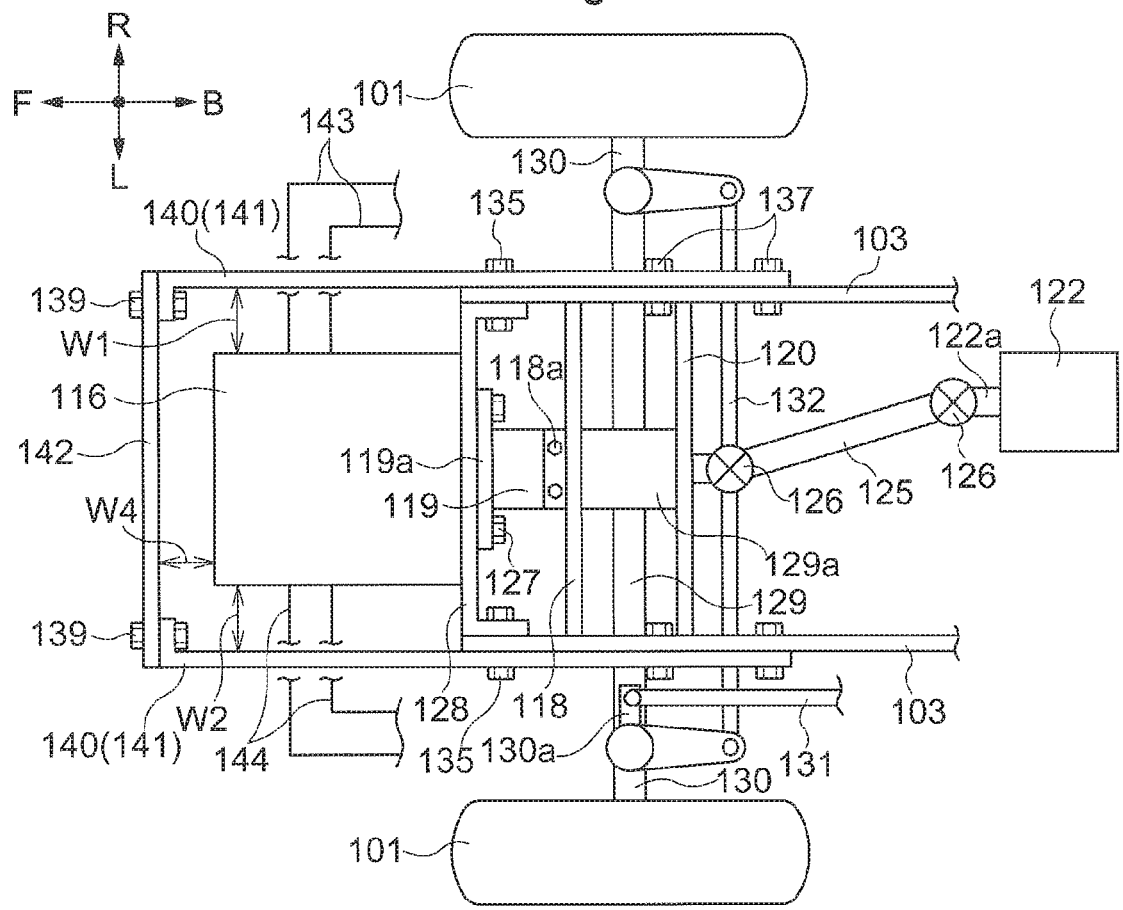
FIG. 9 is a plan view showing vicinities of the front portion of the machine body frame and the electric motor.
Figure 10:
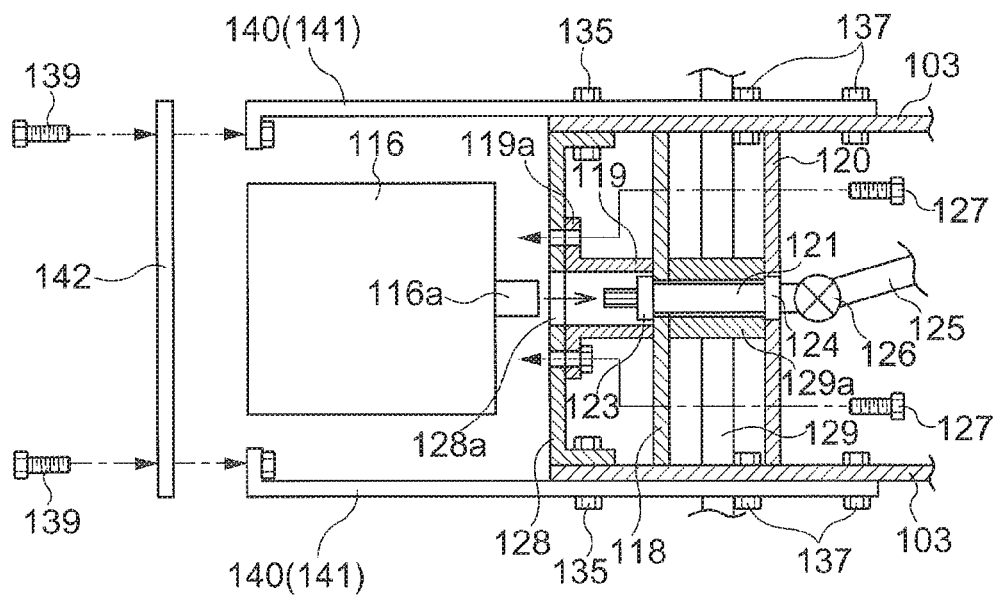
FIG. 10 is an exploded plan view in section showing vicinities of the front portion of the machine body frame and the electric motor.

As shown in FIGS. 8, 9 and 10, to/between front portions of the right and left machine body frames 103, a support frame 118 in the form of a flat plate is connected, and to a flange portion 118a of the front face portion of the support frame 118, a support member 119 in the form of an angular tube is bolt-connected to protrude forwards from the support frame 118. On the rear side of the support frame 118, a support frame 120 in the form of a flat plate is connected to/between the front portions of the right and left machine body frames 103.

A front transmission shaft 121 is disposed along the front/rear direction and a front portion of this front transmission shaft 121 is rotatably supported by a bearing 123 inside the support member 119; and a rear portion of the front transmission shaft 121 is rotatably supported by a bearing 124 to the support frame 120.

An input case 122 for transmitting power to the blades of the mower 105 is provided at the right/left center portion of the mower 105 and an input shaft 122a of the input case 122 extends forwards. To the rear end portion of the front transmission shaft 121, a rear end portion of a rear transmission shaft 125 is connected via a universal joint 126 and a rear end portion of the rear transmission shaft 125 is connected to the input shaft 122a of the input case 122 via the universal joint 126.

To/between front portions (front end portions) of the right and left machine body frames 103, a support frame 128 in the form of a flat plate is connected with bolts 134, 135, 136. The center portion of the support frame 128 is placed in contact with the front end portion of the support member 119, and an opening 128a is formed at the center portion of the support frame 128.

(Arrangements Relating to Front Reinforcement Frame, Upper Reinforcement Frame and Lower Reinforcement Frame Connected to Front Portions of Machine Body Frames)

As shown in FIGS. 6 through 9, right and left upper reinforcement frames 140 (corresponding to "reinforcement frame") are connected with bolts 135, 137 to upper portions of front portions of the right and left machine body frames 103 and extend to protrude forwards from the front end portions of the machine body frames 103. With the bolts 135, the support frame 128 and the upper reinforcement frames 140 are connected under temporarily mutually fastened states to the machine body frames 103.

Right and left lower reinforcement frames 141 (corresponding to "reinforcement frame") are connected with bolts 136, 138 to lower portions of the front portions of the right and left machine body frames 103 and extend to protrude forwards from the front end portions of the machine body frames 103. With the bolts 136, the support frame 128 and the lower reinforcement frames 141 are connected under temporarily mutually fastened states to the machine body frames 103.

A front reinforcement frame 142 in the form of a flat plate is connected with bolts 139 to/between the front portions of the right and left upper reinforcement frames 140 and the front portions of the right and left lower reinforcement frames 141. As described previously (the supporting arrangement for the mower), support brackets 145 are connected to the upper reinforcement frames 140.

(Supporting Arrangement for Front Wheels)

As shown in FIGS. 8 and 9, there is provided a front wheel support frame 129 to which the right and left front wheels 101 are supported to be steerable. Right and left front wheel support portions 130 supporting the front wheels 101 are supported to a right portion and a left portion of the front wheel support frame 129 to be steerable.

A steering rod 131 operated along the front/rear direction by the steering wheel 111 is connected to a knuckle arm 130a of the left front wheel support portion 130 and to/between the right and left front wheel support portions 130, a tie rod 132 is connected. In this case, the tie rod 132 passes through an opening 103b of the machine body frame 103, and passes under the universal joint 126 connecting the front transmission shaft 121 with the rear transmission shaft 125.

With the above-described arrangement, when the steering wheel 111 is operated, the steering rod 131 is operated in the front/rear direction, whereby the front wheels 101 (front wheel support portions 130) are steered by the knuckle arm 130a of the left front wheel support portion 130 and the tie rod 132.

(Rolling Supporting Arrangement for Front Wheel Support Frame)

As shown in FIGS. 8, 9 and 10, a cylindrical boss portion 129a is connected to the right/left center portion of the front wheel support frame 129. Onto a portion of the front transmission shaft 121 which portion is located between the support frame 118 and the support frame 120, a boss portion 129a of the front wheel support frame 129 is rotatably engaged; and this front wheel support frame 129 is rollably supported to the front transmission shaft 121 to be capable of rolling.

The right and left machine body frames 103 respectively defines a cutout portion 103a which is opened downwards, and as the front wheel support frame 129 is fitted into the cutout portion 3a of the machine body frame 103 from the underside, rolling action of the front wheel support frame 129 is allowed. The positions at which the front wheel support frame 129 comes into abutment against an upper side portion of the cutout portion 103a of the machine body frame 103 are right and left limit positions of rolling of the front wheel support frame 129.

To a portion of the machine body frame 103 adjacent the front side of the cutout portion 103a, the support frame 118 is connected along the vertical direction to follow the cutout portion 103a of the machine body frame 103. To a portion of the machine body frame 103 adjacent the rear side of the cutout portion 103a, the support frame 120 is connected along the vertical direction to follow the cutout portion 103a of the machine body frame 103.

(Electric Motor for Driving Mower)

As shown in FIGS. 6 and 7, an electric motor 116 for driving the mower 105 is provided. A battery 117 for supplying electric power to the electric motors 109, 116 is supported to an upper portion of the front portions of the machine body frames 103 and supported to upper portions of the upper reinforcement frames 140.

(Supporting Process of Electric Motor Driving Mower)

When the electric motor 116 is to be supported to the machine body frames 103, as shown in FIG. 10, the front reinforcement frame 142 and the bolts 139 will be detached from the upper reinforcement frames 140 and the lower reinforcement frames 141 and the support links 146 shown in FIGS. 6 and 7 will be detached.

Under the above-described condition, as shown in FIG. 10, the electric motor 116 will be inserted between the right and left upper reinforcement frames 140 and between the right and left lower reinforcement frames 141, with the output shaft 116a of this electric motor 116 being oriented rearwards.

When the output shaft 116a of the electric motor 116 is inserted into the support member 119 through the openings 128a of the support frames 128, inside the support member 119, the output shaft 116a of the electric motor 116 will be connected to the portion of the front transmission shaft 121 which portion is supported to the support member 119 (bearing 123). The output shaft 116a of the electric motor 116 and the front transmission shaft 121 are connected via a spline arrangement.

As described above, when the output shaft 116a of the electric motor 116 has been inserted into the support member 119 and connected to the front transmission shaft 121, the portion of the electric motor 116 on the side of the output shaft 116a will come into contact with the support frame 128, so that the portion of the electric motor 116 on the side of the output shaft 116a, the support frame 128 and the flange portion 119a of the support member 119 will be connected to each other with bolts 127.

With the above, the portion of the electric motor 116 on the side of the output shaft 116a will be connected to the support member 128 (the flange portion 119a of the support member 119) and the electric motor 116 will be supported to the right and left machine body frames 103 via the support frame 128, the support member 119 and the support frame 118.

Thereafter, when the front reinforcement frame 142 is connected to the upper reinforcement frames 140 and the lower reinforcement frames 141 with the bolts 139, the front reinforcement frame 142 is disposed forwardly of the electric motor 116. The support link 146, as shown in FIG. 6 and FIG. 7, will be attached to/between the support bracket 145 and the mower 105.

Power of the electric motor 116 is transmitted to the input shaft 122*a* of the input case 122 from the output shaft 116*a* of the electric motor 116, via the front transmission shaft 121 and the rear transmission shaft 125. As shown in FIG. 6 and FIG. 7, cut grass pieces cut by the mower 105 will be conveyed and fed to the grass collecting portion 107 through a duct 133 disposed on the lateral side of the electric motor 109 and the upper side of the transmission case 108.

When the electric motor 116 is to be detached, from the condition shown in FIG. 8 and FIG. 9, the front reinforcement frame 142 and the bolts 139 will be detached from the upper reinforcement frames 140 and the lower reinforcement frames 141 and the bolts 127 will be removed. The support link 146 shown in FIG. 6 and FIG. 7 will be removed.

Thereafter, by withdrawing the electric motor 116 to the front side, the output shaft 116*a* of the electric motor 116 will be pulled out of the front transmission shaft 121, and the electric motor 116 will be withdrawn to the front side from between the right and left upper reinforcement frames 140 and between the right and left lower reinforcement frames 141.

(Position Relations between Electric Motor and Respective Portions)

As shown in FIG. 8 and FIG. 9, when the electric motor 116 is connected to the support frame 128, the position relations between this electric motor 116 and the respective portions are as described below.

The electric motor 116 protrudes forwardly from the front end portions of the machine body frames 103 as seen in the side view and is positioned on the front side of the front wheels 101.

An upper end portion 116*b* of the electric motor 116 is disposed at a position lower than the upper end portion 103*c* of the front portion of the machine body frame 103 as seen in the side view. Whereas, a lower end portion 116*c* of the electric motor 116 is disposed at a position higher than the lower end portion 103*d* of the front portion of the machine body frame 103 as seen in the side view.

The right upper reinforcement frame 140, the right lower reinforcement frame 141 and the electric motor 116 are disposed with a predetermined space W1 therebetween as seen in the side view, with the right upper reinforcement frame 140 and the right lower reinforcement frame 141 being positioned on the outer side.

The left upper reinforcement frame 140, the left lower reinforcement frame 141 and the electric motor 116 are disposed with a predetermined space W2 therebetween as seen in the side view, with the left upper reinforcement frame 140 and the left lower reinforcement frame 141 being positioned on the outer side.

The upper reinforcement frame 140 and the lower reinforcement frame 141 are disposed with a predetermined space W3 therebetween corresponding to the vertical width of the front portion of the machine body frame 103 as seen in the side view.

In case a harness 143 for supplying electric power of the battery 117 to the electric motor 116 or a cooling hose 144 for feeding/discharging cooling water to/from the electric motor 116 is to be disposed, such harness 143 or the cooling hose 144 will be disposed with effectively utilizing the space (space W1) between the right upper reinforcement frame 140, the right lower reinforcement frame 141 and the electric motor 116, the space between the left upper frame 140, the left lower frame 141 and the electric motor 116 (space W2) and the space (W3) between the upper reinforcement frame 140 and the lower reinforcement frame 141.

In this case, in the space (space W3) between the upper reinforcement frame 140 and the lower reinforcement frame 141, an attachable and detachable lid member (not shown) made of sheet metal or synthetic resin may be provided. In such arrangement, the lid member may be provided with an opening for allowing passage of the harness 143 or the cooling hose 144 therethrough.

The front reinforcement frame 142 and the electric motor 116 are disposed with a predetermined space W4 therebetween as seem in the side view, with the front reinforcement frame 142 being positioned on the outer side.

The front reinforcement frame 142 functions as a "bumper" for the front side of the electric grass cutting machine and functions also as a "protector" for protecting the front portion of the electric motor 116. An angle sensor (not shown) provided at the front portion of the electric motor 116 is protected by the front reinforcement frame 142.

Modifications of Second Embodiment (1) Respecting the space W1 between the right upper reinforcement frame 140, the right lower reinforcement frame 141 and the electric motor 116, and the space W2 between the left upper reinforcement frame 140, the left lower reinforcement frame 141 and the electric motor 116 shown in FIG. 9, instead of setting the space W1 and the space W2 to a same value, it is also possible to set the space W1 to a greater value than the space W2, or vice versa, i.e., to set the space W2 to a greater value than the space W1.

Respecting the space W1 between the right upper reinforcement frame 140 and the electric motor 116 and the space W1 between the right lower reinforcement frame 141 and the electric motor 116, these may be set to a same value. Alternatively, one space W1 may be set to a large value and the other space W1 to a small value.

Respecting the space W2 between the left upper reinforcement frame 140 and the electric motor 116, and the space W2 between the left lower reinforcement frame 141 and the electric motor 116, these may be set to a same value. Alternatively, one space W2 may be set to a large value and the other space W2 to a small value.

(2) Of the upper reinforcement frames 140 and the lower reinforcement frames 141, e.g. the lower reinforcement frames 141 may be omitted and the right and left upper reinforcement frames 140 may be used as the "reinforcement frames". In this case, the upper reinforcement frames 140 may be connected to the vicinity of the vertical intermediate portions of the front portions of the machine body frames 103.

In the above-described arrangement, respecting the space W1 between the right reinforcement frame and the electric motor 116 and the space W2 between the left reinforcement frame and the electric motor 116, the space W1 and the space W2 may be set to a same value or the space W1 may be set to a greater value than the space W2, or the space W2 may be set to a greater value than the space W1.

(3) It is possible to arrange such that the electric motor 116 is supported to the right and left machine body frames 103 via the support frame 128 by connecting the front reinforcement frame 142 to the front portion of the electric motor 116 and also the electric motor 116 is supported to the right and left machine body frames 103, via the front reinforcement frame 142, the upper reinforcement frames 140 and the lower reinforcement frames 141.

(4) With omission of the upper reinforcement frames 140 and the lower reinforcement frames 141 as well as the front reinforcement frame 142, it is possible to arrange such that the electric motor 116 is supported to the right and left machine body frames 103 via the support frame 128 (the support member 119 and the support frame 118).

(5) With omission of the electric motor 116, it is possible to arrange such that the electric motor 109 is disposed at the front portions of the machine body frames 103 and power of this electric motor 109 is transmitted to the transmission case 108 and this power transmitted to the transmission case 108 is transmitted to the front wheels 102 and the mower 105 (input case 122).

In the above-described arrangement, the arrangement shown in FIGS. 6 through 10 may be applied to the electric motor 109.

Instead of the mower 105, a rotary cultivator (not shown) for cultivating a field or an agent sprayer (not shown) for spraying an agent onto a field may be mounted as the "implement". Instead of the front wheels 101 and the rear wheels 102, a crawler type traveling device may be mounted.

In an electric work vehicle mounting an implement that does not require power, it may be arranged such that the power of the above-described electric motor 109 is transmitted to the front wheels 101 and the rear wheels 102.

Third Embodiment (General Configuration of Electric Grass Cutting Machine)

Figure 11:
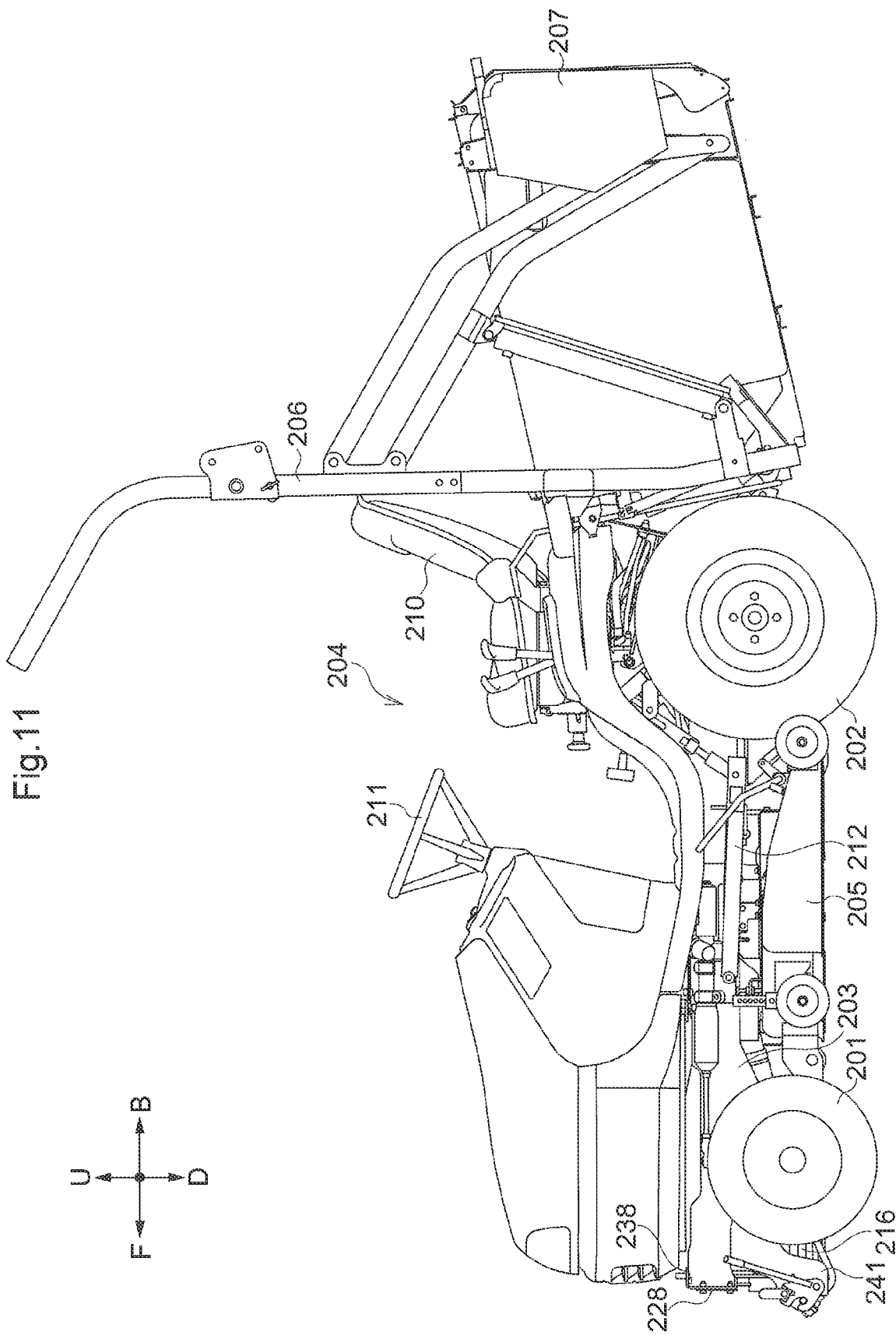
FIG. 11 is a left side view of an electric grass cutting machine according to a third embodiment (same is true with subsequent drawings up to FIG. 15)
Figure 12:
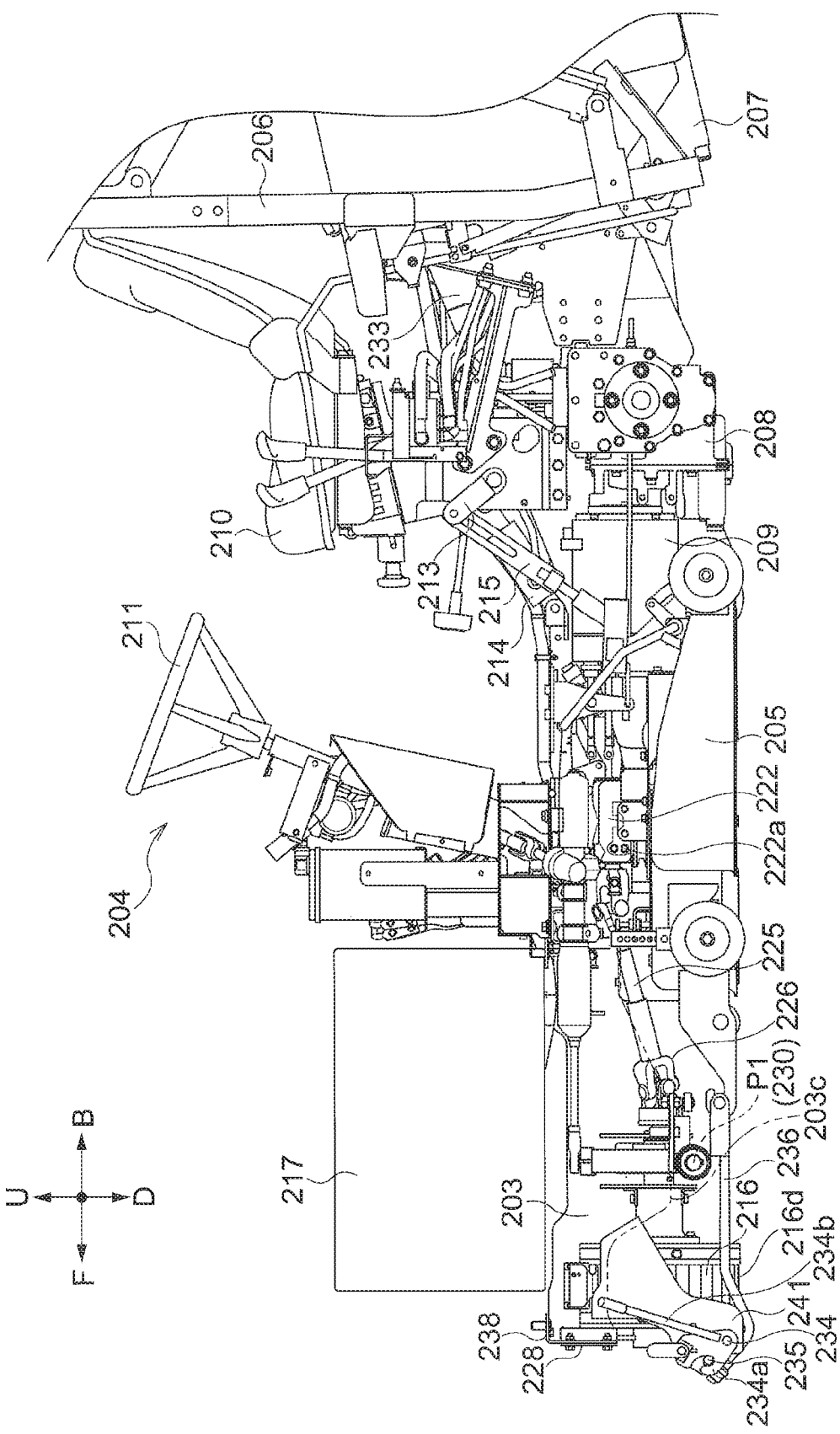
FIG. 12 is a left side view showing the inside of the electric grass cutting machine.

As shown in FIG. 11 and FIG. 12, right and left machine body frames 203 are disposed along the front/rear direction, and at front portions of the machine body frames 203, right and left front wheels 201 are supported and at rear portions of the machine body frames 203, right and left rear wheels 202 are supported.

Upwardly of the rear portions of the machine body frames 203, a driving section 204 is supported. On the machine body frames 203 and between the front wheels 201 and the rear wheels 202, a mower 205 is supported. At rear portions of the machine body frames 203, a ROPS frame 206 is provided and a grass collecting section 207 is supported to this ROPS frame 206.

The above-described arrangements constitute a riding type electric grass cutting machine.

(Configuration of Rear Portion of Electric Grass Cutting Machine)

As shown in FIG. 11 and FIG. 12, to rear portions of the machine body frames 203, a transmission case 208 is connected; and to this transmission case 208, the right and left rear wheels 202 are supported. An electric motor 209 for traveling is disposed under a rear orientation and connected to a front portion of the transmission case 208. With power from the electric motor 209, the rear wheels 202 are driven.

To a rear portion of the transmission case 208, the ROPS frame 206 is connected. A driver's seat 210 and a steering wheel 211 for steering the front wheels 201 are provided in the driving section 204.

(Supporting Arrangement of Mower)

As shown in FIG. 11 and FIG. 12, the mower 205 is of a type in which three blades (not shown) rotatably driven about vertical axes are disposed side by side along the right/left direction.

Front portions of right and left support links 212 are supported to be vertically pivotable about axes extending in the right/left direction of the machine body frames 203. The support links 212 extend rearwards and the mower 205 is connected to rear portions of the support links 212.

As shown in FIGS. 11-14, to front portions of the machine body frames 203, right and left support brackets 241 are connected. To/between the support brackets 241, an operational shaft 234 is rotatably supported. And, to a right end portion and a left end portion of the operational shaft 234, hook-like support members 234a are connected and an operational lever 234b is connected to the left support member 234a.

To a right portion and a left portion of a support shaft 235 disposed in the right/left direction, support links 236 are connected and extend rearwards. In the condition shown in FIGS. 12, 13 and 14, a right portion and a left portion of the support shaft 235 are rotatably supported to support members 234a of the operational shafts 234 and the support links 236 extend rearwards to be connected to the mower 205.

As shown in FIG. 12, there are provided right and left vertically pivotable operational arms 213 and lift cylinders 214 are provided for pivotally operating the operational arms 213. Between the operational arm 213 and a rear portion of the support link 214, a coupling link 215 is connected. In operation, as thee operational arm 213 is vertically pivoted by the lift cylinder 214, the mower 205 is lifted up/down.

(Electric Motor for Driving Mower)

As shown in FIGS. 11 through 14, an electric motor 216 for driving the mower 205 is supported to front portions of the machine body frames 203 to be located forwardly of the front wheels 201 as seen in a side view. A battery 217 for supplying electric power to the electric motors 209, 216 is supported to an upper portion of the front portions of the machine body frames 203.

(Supporting Arrangement for Electric Motor Driving Mower)

Figure 13:
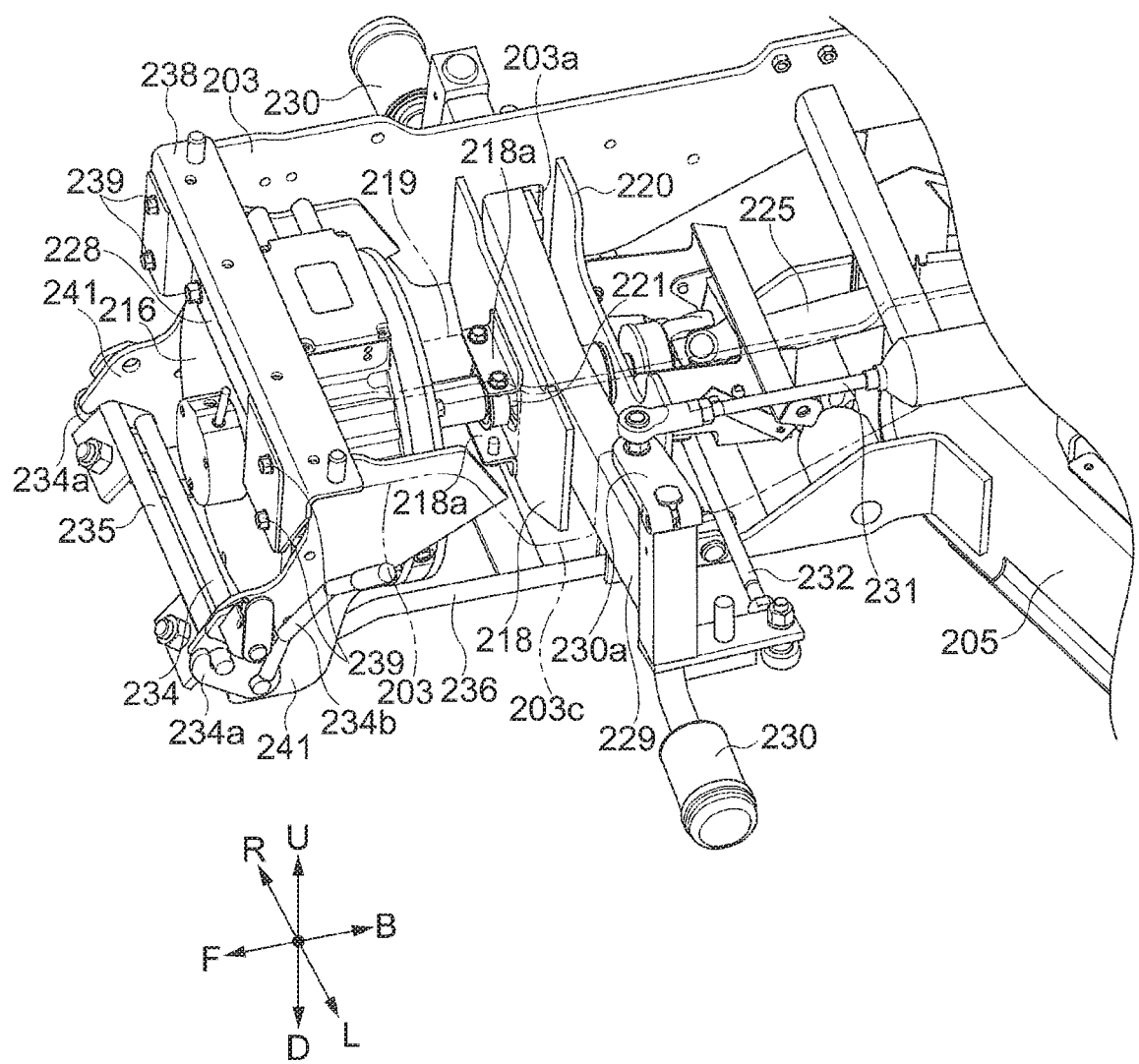
FIG. 13 is an exploded perspective view showing vicinities of a front portion of a machine body frame and an electric motor.
Figure 15:
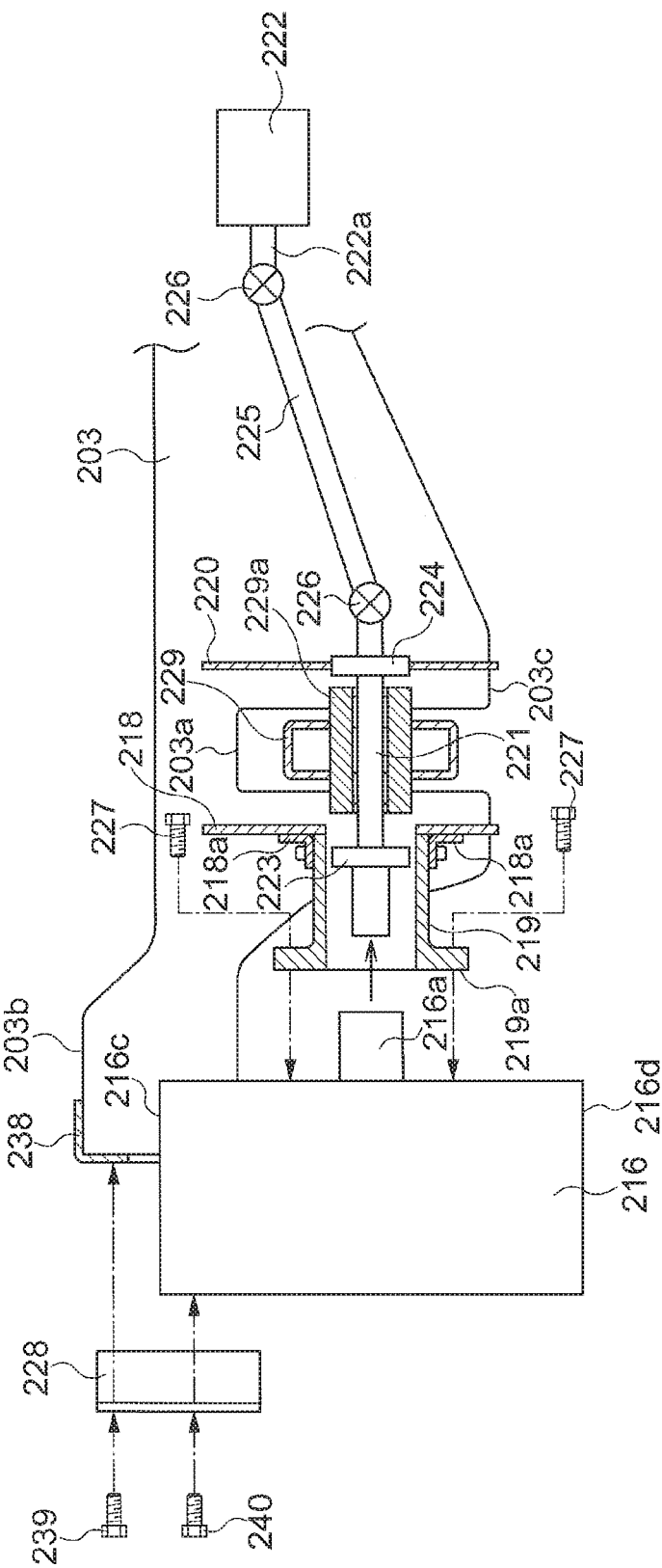
FIG. 15 is an exploded side view in vertical section showing vicinities of the front portion of the machine body frame and the electric motor.

As shown in FIG. 13 and FIG. 15, to/between front portions of the right and left machine body frames 203, a front support frame 218 in the form of a flat plate is connected. To a flange portion 218a of the front face portion of the front support frame 218, a support member 219 in the form of an angular tube is bolt-connected to protrude forwards from the support frame 218. A support frame 220 in the form of a flat plate is connected to/between front portions of the right and left machine body frames 203 and is disposed on the rear side of the support frame 218.

Figure 14:
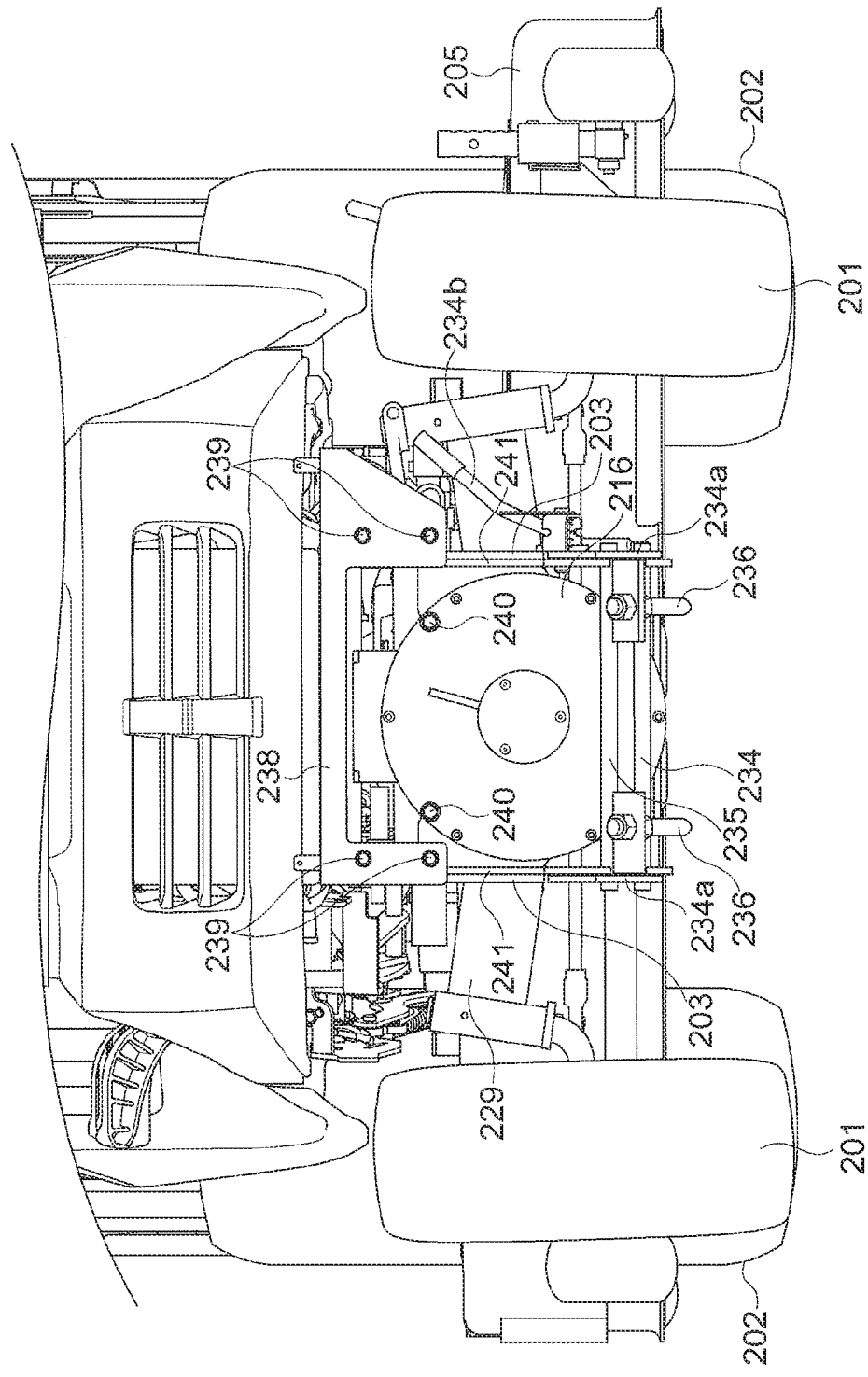
FIG. 14 is a front view showing vicinities of the front portion of the machine body frame and the electric motor.

As shown in FIGS. 13, 14 and 15, to/between upper portions of the front end portions of the right and left machine body frames 203, a support frame 238 is connected. A motor frame 228 formed by bending a flat plate is connected to the support frame 238 with bolts 239.

As shown in FIG. 13 and FIG. 15, a front transmission shaft 221 is disposed along the front/rear direction, wherein a front portion of this front transmission shaft 221 is rotatably supported by a bearing 223 inside the support member 219, and a rear portion of the front transmission shaft 221 is rotatably supported by a bearing 224 to the rear support frame 220.

An input case 222 for transmitting power to the blades of the mower 205 is provided at the right/left center portion of the mower 205 and an input shaft 222a of the input case 222 extends forwards. To the rear end portion of the front transmission shaft 221, a rear end portion of a rear transmission shaft 225 is connected via a universal joint 226 and a rear end portion of the rear transmission shaft 225 is connected to the input shaft 222a of the input case 222 via the universal joint 226.

(Supporting Process of Electric Motor Driving Mower)

As shown in FIGS. 13, 14 and 15, the motor frame 228 will be detached from the support frame 238. By operating the operational lever 234b of the operational shaft 234 forwards, the support member 234a of the operational shaft 234 will be operated to the front side, and the support shaft 235 and the support link 236 will be detached from the support member 234a of the operational shaft 234.

Under the above-described condition, the electric motor 216, with the output shaft 216a of the electric motor 216 being oriented rearwards, will be inserted between the front portions of the right and left machine body frames 203 (between the right and left support brackets 241) and passed between the support frame 238 and the operational shaft 234.

Next, the output shaft 216a of the electric motor 216 will be inserted into the inside of the support member 219. Inside the support member 219, the output shaft 216a of the electric motor 216 will be connected to the portion of the front transmission shaft 221 which portion is supported to the support member 219 (bearing 223). The output shaft 216a of the electric motor 216 and the front transmission shaft 221 are connected via a spline arrangement.

When the output shaft 216a of the electric motor 216 has been inserted into the support member 219 and connected to the front transmission shaft 221, the portion of the electric motor 216 on the side of the output shaft 216a will come into contact with the flange portion 219a of the support member 219, so that the portion of the electric motor 216 on the side of the output shaft 216a and the flange portion 219a of the support member 219 will be connected to each other with bolts 227.

With the above, the portion of the electric motor 216 on the side of the output shaft 216a will be connected to the front end portion (flange portion 219a) of the support member 219, and the front support frame 218 and the portion of the electric motor 216 on the side of the output shaft 216a will be disposed with a space therebetween corresponding to the length of the support member 219.

After establishment of connection between the portion of the electric motor 216 on the side of the output shaft 216a and the flange portion 219a of the support member 219, the motor frame 228 will be connected to the support frame 238 with bolts 239 and the motor frame 228 will be connected to the portion of the electric motor 216 opposite to the side of the output shaft 216a. The support shaft 235 and the support link 236 will be attached as shown in FIGS. 11-14.

With the above-described arrangements, the electric motor 216 will be supported to the right and left machine body frames 203 via the support member 219 and the front support frame 218 and supported to the right and left machine body frames 203 via the motor frame 238 and the support frame 238.

Power of the electric motor 216 is transmitted from the output shaft 216a of the electric motor 216 via the front transmission shaft 221 and the rear transmission shaft 225 to the input shaft 222a of the input case 222, whereby the blades of the mower 205 are rotatably driven. As shown in FIG. 11 and FIG. 12, cut grass pieces cut by the mower 205 are fed through a duct 233 disposed laterally of the electric motor 209 and upwardly of the transmission case 208 to the grass collecting portion 207.

(Position Relations between Electric Motor and Respective Portions)

As shown in FIG. 11 and FIG. 12, when the electric motor 216 is supported to the machine body frames 203, this electric motor 216 is disposed forwardly of the front wheels 201 as seen in the side view.

As shown in FIG. 15, an upper end portion 216c of the electric motor 216 is disposed at a position lower than an upper end portion 203b of the front portion of the machine body frame 203 as seen in the side view. A lower end portion 216d of the electric motor 216, as seen in the side view, is disposed at a position lower than a lower end portion 203c of the machine body frame 203.

As shown in FIGS. 12, 13 and 15, a rotational axis P1 of the front wheel 201 (the front wheel support portion 230), as seen in the side view, is disposed at a position lower than the lower end portion 203c of the front portion of the machine body frame 203, and the lower end portion 216d of the electric motor 216 is disposed at a position lower than the rotational axis P1 of the front wheel 201 (front wheel support portion 230), as seen in the side view.

(Supporting Arrangement for Front Wheels)

As shown in FIGS. 13, 14 and 15, there is provided a front wheel support frame 229 to which the right and left front wheels 201 are supported to be steerable. Right and left front wheel support portions 230 supporting the front wheels 201 are supported to a right portion and a left portion of the front wheel support frame 229 to be steerable.

A steering rod 231 operated along the front/rear direction by the steering wheel 211 is connected to a knuckle arm 230a of the left front wheel support portion 230 and to/between the right and left front wheel support portions 230, a tie rod 232 is connected. In this case, the tie rod 232 passes under the machine body frames 203 and under the universal joint 226 connecting the front transmission shaft 221 with the rear transmission shaft 225.

With the above-described arrangement, when the steering wheel 211 is operated, the steering rod 231 is operated in the front/rear direction, whereby the front wheels 201 (front wheel support portions 230) are steered by the knuckle arm 230a of the left front wheel support portion 230 and the tie rod 232.

(Rolling Supporting Arrangement for Front Wheel Support Frame)

As shown in FIG. 13 and FIG. 15, a cylindrical boss portion 229a is connected to the right/left center portion of the front wheel support frame 229. Onto a portion of the front transmission shaft 221 which portion is located between the front support frame 218 and the rear support frame 220, a boss portion 229a of the front wheel support frame 229 is rotatably engaged and this front wheel support frame 229 is rollably supported to the front transmission shaft 221 to be capable of rolling.

The right and left machine body frames 203 respectively defines a cutout portion 203a which is opened downwards. As the front wheel support frame 229 is fitted into the cutout portion 203a of the machine body frame 203 from the underside, rolling action of the front wheel support frame 229 is allowed. The positions at which the front wheel support frame 229 comes into abutment against an upper side portion of the cutout portion 303a of the machine body frame 203 are right and left limit positions of rolling of the front wheel support frame 229.

To a portion of the machine body frame 203 adjacent the front side of the cutout portion 203a, the front support frame 218 is connected along the vertical direction to follow the cutout portion 203a of the machine body frame 203. To a portion of the machine body frame 203 adjacent the rear side of the cutout portion 203a, the rear support frame 220 is connected along the vertical direction to follow the cutout portion 203a of the machine body frame 203.

Modifications of Third Embodiment (1) With omission of the electric motor 216, it is possible to arrange such that the electric motor 209 is disposed at the front portions of the machine body frames 203 and power of this electric motor 209 is transmitted to the transmission case 208 and this power transmitted to the transmission case 208 is transmitted to the rear wheels 202 and the mower 205 (input case 222).

In the above-described arrangement, the arrangement shown in FIGS. 13, 14 and 15 may be applied to the electric motor 209.

(2) Instead of the mower 205, a rotary cultivator (not shown) for cultivating a field or an agent sprayer (not shown) for spraying an agent onto a field may be mounted as the "implement".

What is claimed is:

1. An electric work vehicle comprising:
   front wheels and rear wheels for traveling:
   right and left machine body frames extending along a front/rear direction; and
   an electric motor, the electric motor having either one of a front output shaft protruding forwards or a rear output shaft protruding rearwards, the electric motor being supported to front portions of the machine body frames to be located forwardly of the front wheels as seen in a side view,
   wherein a lower end portion of the electric motor is disposed at a position lower than a rotational axis of the front wheels, as seen in a side view.

2. The electric work vehicle of claim 1, wherein an upper end portion of the electric motor is disposed at a position lower than upper end portions of the front portions of the machine body frames, as seen in a side view.

3. The electric work vehicle of claim 2, wherein the lower end portion of the electric motor is disposed at a position lower than lower end portions of the front portions of the machine body frames, as seen in a side view.

4. The electric work vehicle of claim 3, wherein:
   the rotational axis of the front wheels is disposed at a position lower than lower end portions of the front portions of the machine body frames, as seen in a side view.

5. The electric work vehicle of claim 1, wherein axes of the front output shaft and the rear output shaft of the electric motor are disposed at positions which are lower than the upper end portions of the front portions of the machine body frames and which also are higher than the rotational axis of the front wheels.

6. An electric work vehicle comprising:
   right and left machine body frames extending along a front/rear direction;
   a support frame connected to/between front portions of the right and left machine body frames;
   a plurality of reinforcement frames connected to the front portions of the right and left machine body frames and extending forward; and
   an electric motor for feeding power to at least one of a traveling device and an implement, the electric motor being connected to the support frame in such a manner as to protrude forwards from front end portions of the machine body frames as seen in a side view, and being supported to the right and left machine body frames via the support frame,
   wherein each of the plurality of reinforcement frames and the electric motor are disposed with a predetermined space therebetween, with each of the plurality of reinforcement frames being disposed on the outer side, as seen in a plan view.

7. The electric work vehicle of claim 6, wherein an upper end portion of the electric motor is disposed at a position lower than upper end portions of the front portions of the machine body frames, as seen in a side view.

8. The electric work vehicle of claim 6, wherein a lower end portion of the electric motor is disposed at a position higher than lower end portions of the front portions of the machine body frame as seen in a side view.

9. The electric work vehicle of claim 6, wherein the plurality of reinforcement frames comprise:
   right and left reinforcement frames connected to the front portions of the right and left machine body frames and extending forwards; and
   a front reinforcement frame connected to/between front portions of the right and left reinforcement frame and disposed forwardly of the electric motor,
   wherein the right reinforcement frame and the electric motor being disposed with a predetermined space therebetween; and
   the left reinforcement frame and the electric motor being disposed with a predetermined space therebetween, as seen in a plan view.

10. The electric work vehicle of claim 6, wherein the plurality of reinforcement frames comprise:
    right and left upper reinforcement frames connected to upper portions of the front portions of the right and left machine body frames and extending forwards;
    right and left lower reinforcement frames connected to lower portions of the front portions of the right and left machine body frames and extending forwards; and
    a front reinforcement frame connected to/between front portions of the right and left upper reinforcement frames and front portions of the right and left lower reinforcement frames and disposed forwardly of the electric motor;
    wherein the right upper reinforcement frame, the right lower reinforcement frame and the electric motor being disposed with a predetermined space therebetween; and
    the left upper reinforcement frame, the left lower reinforcement frame and the electric motor being disposed with a predetermined space therebetween.

11. The electric work vehicle of claim 10, wherein the upper reinforcement frames and the lower reinforcement frames are disposed with a predetermined space therebetween as seen in the side view.

12. The electric work vehicle of claim 9, wherein a front portion of the electric motor is connected to the front reinforcement frame.

13. An electric work vehicle comprising:
    right and left machine body frames extending along a front/rear direction;
    a front support frame connected to/between front portions of the right and left machine body frames;
    a support member connected to the front support frame;
    a front transmission shaft for transmitting power along the front/rear direction, the front transmission shaft being rotatably supported to the support member; and
    an electric motor having a rearwardly oriented output shaft;
    wherein the output shaft is supported to a portion of the front transmission shaft which portion is supported to the support member; and
    a portion of the electric motor on the side of the output shaft is connected to the support member.

14. The electric work vehicle of claim 13, wherein:
    the support member is connected to the front support frame to protrude forwards from the front support frame;

a portion of the electric motor on the side of the output shaft is connected to a front end portion of the support member; and the front support frame and the portion of the electric motor on the side of the output shaft are disposed with a predetermined space therebetween.

15. The electric work vehicle of claim 13, further comprising a motor frame connected to/between a portion of the electric motor opposite to the output shaft and the right and left machine body frames.

16. The electric work vehicle of claim 13, further comprising:

a rear transmission shaft connected via a universal joint to a rear end portion of the front transmission shaft; and a rear support frame disposed on the rear side of the front support frame and connected to/between the right and left machine body frames;

wherein a front portion of the front transmission shaft is rotatably supported to the support member, and a rear portion of the front transmission shaft is rotatably supported to the rear support frame.

17. The electric work vehicle of claim 16, further comprising:

a front wheel support frame supporting right and left front wheels steerably;

wherein the front wheel support frame is rollably supported to a portion of the front transmission shaft which portion is located between the front support frame and the rear support frame.

18. The electric work vehicle of claim 17, wherein:

the respective machine body frame defines a cutout portion that allows rolling movement of the front wheel support frame with introduction of the front wheel support frame therein;

at a portion of the machine body frame forwardly of the cutout portion, the front support frame is connected; and at a portion of the machine body frame rearwardly of the cutout portion, the rear support frame is connected.

\* \* \* \* \*